(12) United States Patent
Hunwick

(10) Patent No.: US 12,479,738 B2
(45) Date of Patent: Nov. 25, 2025

(54) PROCESS AND SYSTEM FOR LITHIUM PRODUCTION

(71) Applicant: ICSIP PTY LTD, Sydney (AU)

(72) Inventor: Richard James Hunwick, Waterford (AU)

(73) Assignee: ICSIP PTY LTD, Sydney (AU)

( * ) Notice: Subject to any disclaimer, the term of this patent is extended or adjusted under 35 U.S.C. 154(b) by 0 days.

(21) Appl. No.: 18/787,464

(22) Filed: Jul. 29, 2024

(65) Prior Publication Data

US 2024/0409425 A1    Dec. 12, 2024

Related U.S. Application Data

(63) Continuation of application No. 18/729,344, filed as application No. PCT/AU2022/051538 on Dec. 19, 2022.

(30) Foreign Application Priority Data

Jan. 17, 2022    (AU) ................................ 2022900080

(51) Int. Cl.
    *C01D 15/02*    (2006.01)
    *C01B 21/38*    (2006.01)
    (Continued)

(52) U.S. Cl.
    CPC .............. *C01D 15/02* (2013.01); *C01B 21/38* (2013.01); *C01D 15/08* (2013.01); *C01F 7/24* (2013.01);
    (Continued)

(58) Field of Classification Search
    None
    See application file for complete search history.

(56) References Cited

U.S. PATENT DOCUMENTS 1,531,336 A    3/1925    Field
1,863,986 A    6/1932    Jourdn
(Continued)

FOREIGN PATENT DOCUMENTS

CA    3199218 A1    5/2022
CN    1299884       6/2001
(Continued)

OTHER PUBLICATIONS

English translation of CN-102765734-A Description. (Year: 2012).*
(Continued)

*Primary Examiner* — Anthony J Zimmer
*Assistant Examiner* — Zachary John Baum
(74) *Attorney, Agent, or Firm* — Barnes & Thornburg LLP; G. Peter Nichols

(57) ABSTRACT

A process and system are disclosed for producing a lithium product from a solution comprising lithium nitrate. The solution comprising lithium nitrate can be obtained by reacting a lithium-containing metal silicate with nitric acid. The process and system comprise subjecting the solution comprising lithium nitrate to a first thermal treatment procedure (in one or more heated vessels) in which water and nitric acid (when present) are removed, and whereby a resultant lithium nitrate-rich crystal slurry is heated to produce a molten liquid. The process and system also comprise passing the molten liquid to a second thermal treatment procedure (in a further-heated vessel) in which the molten liquid is heated to substantially decompose lithium nitrate to lithium oxide.

24 Claims, 9 Drawing Sheets

(51) Int. Cl.
*C01D 15/08* (2006.01)
*C01F 7/24* (2006.01)
*C22B 3/06* (2006.01)
*C22B 3/22* (2006.01)
*C22B 3/44* (2006.01)
*C22B 21/00* (2006.01)
*C22B 21/04* (2006.01)
*C22B 26/12* (2006.01)

(52) U.S. Cl.
CPC ............... *C22B 3/065* (2013.01); *C22B 3/22* (2013.01); *C22B 3/44* (2013.01); *C22B 21/0015* (2013.01); *C22B 21/04* (2013.01); *C22B 26/12* (2013.01)

(56) References Cited

U.S. PATENT DOCUMENTS

| | | | |
|---|---|---|---|
| 1,976,564 | A | 10/1934 | Felix |
| 2,021,988 | A | 11/1935 | Corson |
| 2,024,026 | A | 12/1935 | Coleman |
| 2,923,600 | A * | 2/1960 | Archambault .......... C22B 26/12 423/551 |
| 3,965,239 | A | 6/1976 | Posel |
| 5,350,717 | A | 9/1994 | Dy et al. |
| 7,104,124 | B2 | 9/2006 | Stabile et al. |
| 10,131,968 | B2 | 11/2018 | Hunwick |
| 10,883,156 | B2 | 1/2021 | Hunwick |
| 2007/0193379 | A1 | 8/2007 | McCluskey |
| 2012/0226451 | A1 | 9/2012 | Bacot et al. |
| 2015/0325837 | A1 | 11/2015 | Xia |
| 2017/0175228 | A1* | 6/2017 | Hunwick ............... C01D 15/08 |
| 2019/0256987 | A1 | 8/2019 | Snydacker et al. |
| 2021/0387860 | A1 | 12/2021 | Hunwick |
| 2023/0095612 | A1 | 3/2023 | Rezaee et al. |

FOREIGN PATENT DOCUMENTS

| | | |
|---|---|---|
| CN | 102765734 | 11/2012 |
| CN | 105039699 | 11/2015 |
| CN | 107473242 | 12/2017 |
| CN | 108277367 A | 7/2018 |
| CN | 108431253 | 8/2018 |
| CN | 110042262 A | 7/2019 |
| CN | 113651342 | 11/2021 |
| CN | 113772696 A | 12/2021 |
| CN | 113998714 A | 2/2022 |
| CN | 114318008 B | 9/2022 |
| CN | 114105171 B | 10/2023 |
| CN | 115956062 B | 3/2025 |
| EP | 1145740 | 10/2001 |
| EP | 1965121 | 9/2008 |
| FR | 2868160 | 9/2005 |
| FR | 2952432 | 5/2011 |
| GB | 402977 | 12/1993 |
| JP | H024442 | 1/1990 |
| JP | H09326255 | 12/1997 |
| JP | H1154159 | 2/1999 |
| WO | 98/13297 | 4/1998 |
| WO | 2011/082444 | 7/2011 |
| WO | 2011/148040 | 12/2011 |
| WO | 2012/126092 | 9/2012 |
| WO | 2013/097186 | 7/2013 |
| WO | 2013/140039 | 9/2013 |
| WO | 2014/026217 | 2/2014 |
| WO | 2015/123762 | 8/2015 |
| WO | 2015/155684 | 10/2015 |
| WO | 2017/106925 | 6/2017 |
| WO | WO-2017106925 A1 * | 6/2017 ............ C01D 15/02 |
| WO | 2020/107074 | 6/2020 |
| WO | WO2021/094647 | 5/2021 |
| WO | 2021/168210 | 8/2021 |

OTHER PUBLICATIONS

Extended European Search Report issued in EP19888266.4 (Aug. 4, 2022).
Kudryavtsev, P., "Lithium in nature, application, methods of extraction {review}", 2016, Journal Scientific Israel—Technological Advances, vol. 18, No. 3, pp. 63-83.
Meshram et al. "Extraction of Lithium from primary and secondary sources by pre-treatment, leaching and separation: A comprehensive review" Hydrometallurgy; vol. 150, Dec. 1, 2014; pp. 192-208.
Zhang et al, "A study of the interaction of Li2O and γ-alumina," Journal of Solid State Chemistry, vol. 97, No. 2, Apr. 1, 1992, pp. 292-298.
Search Report & Written Opinion issued in PCT/AU2019/051308 (Feb. 12, 2020).
Search Report & Written Opinion issued in PCT/FR2016/053518 (Apr. 4, 2017).
Int'l Preliminary Report on Patentability issued in PCT/AU2022/051538 (May 16, 2024).
Search Report & Written Opinion issued in PCT/AU2022/051538 (Feb. 20, 2023).
Xinjiang's Gems and Jades, Hanchen Yang, et al., Volksverlag Xinjiang, p. 56, published on Jan. 31, 2012 (English Translation).
Deep processing of metals and mineral products, mainly compiled by Yongnian Dai, Metallurgical industry press, pp. 33-34 (English Translation).
Study on extraction of lithium metal by vacuum smelting, written by Bin Yang & Yongnian Dai, Yunnan Science and Technology Press, pp. 91-92 (English Translation).
Engineering research method and testing technology, Zuyuan Qu, Wuhan Industrial University Press, pp. 231-233, published in May, 1995 (English Translation).
Atomic Energy Industry, Peisheng Lian, Atomic Energy Press, May 2002, pp. 244-245 (English Translation).
New Energy Technologies and Applications, p. 83 (publication date: Feb. 28, 2007) (English translation).
Introduction to Rare Metal Metallurgy (publication date: Aug. 31, 1961) (English Translation).
Chemical Encyclopedia (vol. 10) Air Conditioning-Chlorinated Alcohols (publication date: Apr. 30, 1996) (English Translation).
Oil and Gas Gathering and Transportation and Mine Processing (2nd edition), Shuchu Feng, et al., China University of Petroleum Press, May, 2006, pp. 484-485 (English Translation).
Examination Report No. 2 issued in EP2024205225 (Jan. 20, 2025).
Examination Report issued in CA3248339 (Jul. 30, 2025).

* cited by examiner

PROCESS AND SYSTEM FOR LITHIUM PRODUCTION

CROSS REFERENCE TO RELATED APPLICATIONS

This application is a Continuation of U.S. application Ser. No. 18/729,344, filed Jul. 16, 2024, which is a U.S. nationalization under 35 U.S.C. § 371 of International Patent Application No. PCT/AU2022/051538, filed Dec. 19, 2022, which claims priority to Australian application no. 2022900080, filed Jan. 17, 2022; the entire contents of each are incorporated herein by reference.

TECHNICAL FIELD

A process and system are disclosed for producing a lithium product from a solution comprising lithium nitrate. The solution comprising lithium nitrate is typically produced by a process in which lithium is extracted from a lithium silicate mineral using nitric acid. The lithium product can also be converted to products in demand by users of lithium chemicals, in particular lithium carbonate and lithium hydroxide. Lithium metal may also be produced.

BACKGROUND ART

Lithium occurs widely throughout the Earth's crust, with an average concentration of around 20 parts per million, making it less abundant than other valuable metals such as iron and aluminium, but far more abundant than precious metals such as gold and platinum. One of the fastest growing end-uses of lithium is the battery industry. The use of lithium-ion batteries for electric vehicles (EVs) is anticipated to continue to drive the lithium market, as demand for EVs likewise continues to increase.

Additionally, there is increasing demand for lithium in other applications including energy storage systems and as an alloying metal. The net result is that, for lithium supplies to be able to keep up with the ever-increasing demands, sustainable processes for producing lithium are required.

Recovery of lithium from seawater is unlikely to be economically feasible due to the very low concentrations (less than 0.2 parts per million by weight) of lithium in the seawater. This is despite seawater containing more than 200 billion tonnes of lithium altogether.

Currently, production of lithium from brines accounts for much of the world's produced lithium. Most of these brines originate from South American salt lakes (salars) in the so-called 'Lithium Triangle' region extending across Argentina, Bolivia and Chile. However, there are several disadvantages of having a lithium market heavily reliant on South American brines as the major source of lithium. These include sovereign risk issues, environmental challenges, and uncertainties regarding the amount of economically recoverable lithium contained in these brines. Additionally, when solar evaporation is used as a stage in the recovery of lithium from brines, the processing times are significant (up to years), meaning these processes take time to respond to fluctuations in lithium demand.

Increasingly, the world's lithium supplies are met by extracting it from lithium-containing hard-rock silicate minerals. Traditional routes for lithium recovery from hard-rock silicate minerals are expensive, complicated, hazardous and environmentally challenging. Until recently, this has meant that there has been very little interest in pursuing these sources of lithium.

The present inventor has invented (WO2017/106925) an improved process for recovering lithium from silicate minerals using nitric acid, providing an improvement over the prior art that is more than half a century old. The relevant contents of WO2017/106925 are incorporated into the present disclosure by way of cross-reference. The process of WO2017/106925 provides a 'closed' process wherein the major chemical used for extracting lithium values from the metal silicate, namely nitric acid, may be recovered for re-use in extracting further lithium values from the metal silicate. WO2017/106925 describes how the lithium nitrate formed as a result of reacting the metal silicate with nitric acid can be purified and further converted into lithium products for use in the production of lithium batteries (i.e. lithium carbonate and lithium hydroxide). WO2017/106925 also describes how a lithium oxide intermediate product can be converted (i.e. reduced) to lithium metal. However, in the process of WO2017/106925, the purification of lithium nitrate involves subjecting the lithium nitrate solution to a crystallisation stage wherein an intermediate lithium nitrate crystal is produced. This intermediate is essentially a pure lithium nitrate crystal product, which is then further processed into lithium hydroxide. Crystallisation is an energy-intensive process and does not necessarily provide any additional benefit in terms of the required purity of the final product for its intended end-uses.

Other considerations in lithium production include the geographic location of the mined ore source, the type of processing plant, the requirements of the consumer and the associated costs of transporting lithium between each of the source, plant and consumer. For example, transporting lithium as an ore is not as economical as transporting lithium as an oxide, on a lithium basis. Additionally, transporting lithium as an oxide is more economical compared with transporting lithium either as a hydroxide or as a carbonate, on a lithium basis. A process broken up into stages, such that part of the process is performed close to the ore source, with a remainder performed close to a battery plant or by the battery plant, could provide a means of minimising lithium transportation costs. For instance, ore could be mined and processed to a lithium oxide product in a processing plant near the mine. The lithium oxide could then be transported to a battery plant for further processing into a hydroxide, etc.

The above references to the background art do not constitute an admission that such art forms a part of the common and/or general knowledge of a person of ordinary skill in the art. The above references are also not intended to limit the application of the process and system as disclosed herein.

SUMMARY OF THE DISCLOSURE

Disclosed herein in a first aspect is a process for producing a lithium product from a solution comprising lithium nitrate. The solution comprising lithium nitrate may be obtained by reacting a lithium-containing metal silicate with nitric acid. For example, the solution comprising lithium nitrate may be obtained by the process disclosed in WO2017/106925. Herein, the term "lithium product" can include lithium nitrate, lithium oxide, lithium carbonate, lithium hydroxide, and lithium metal (amongst other products comprising lithium).

The process can comprise subjecting the solution comprising lithium nitrate to a first thermal treatment procedure. In the first thermal treatment procedure, water and nitric acid (when present) can be removed. The resultant lithium nitrate-rich crystal slurry can be heated to produce a molten liquid. The heating to produce the molten liquid may take place in a separate vessel/stage.

The process can also comprise passing the molten liquid to a second thermal treatment procedure. In the second thermal treatment procedure, the molten liquid may be heated to substantially decompose lithium nitrate to lithium oxide. As above, the lithium oxide may be the "lithium product" produced by the process, or the lithium oxide may be further processed to produce e.g. lithium carbonate, lithium hydroxide and/or lithium metal (amongst other products).

The process and system disclosed herein has distinct advantages over the prior art in that battery grade lithium hydroxide and marketable grade lithium carbonate may be produced from a solution comprising lithium nitrate using a relatively simple flowsheet. For example, the process and system can have less purification steps than previous processes known in the prior art (including the applicant's process disclosed in WO2017/106925), decreasing the capital/operating costs and operational complexity.

In addition, the relative simplicity allows the process and system as disclosed herein to be installed adjacent to existing lithium mines and concentrators. For example, the process and system can be 'modularised/containerised', as explained in more detail below. A facility for the process and system can be owned and operated by the same owners/operators as the mines/concentrators, allowing them to value-add to their initial product. The flexibility of the process and system can further allow owners/operators to terminate the process at e.g. a stage wherein lithium oxide is the final product. As lithium oxide contains a high percentage of lithium by weight, transportation of a lithium oxide product secures even greater reductions in freight costs than transporting the more familiar final lithium products (hydroxide/carbonate). The lithium oxide can be sold directly to e.g. battery plants, which can convert the less-pure oxide to high-purity lithium hydroxide as required, in their own facilities. Alternatively, the owner/operator may decide to process high-purity lithium hydroxide (and carbonate) on-site with the simple addition of further equipment (e.g. a lithium hydroxide crystalliser).

In some embodiments, in the second thermal treatment procedure, the lithium oxide produced during the decomposition of lithium nitrate may be allowed to float to the top of the molten liquid, thereby producing an overflow of lithium oxide and lithium nitrate slurry, and an underflow of lithium nitrate liquor. Such a flotation stage can facilitate separation of lithium nitrate from the lithium oxide.

In this regard, in some embodiments, the process may further comprise passing the lithium oxide and lithium nitrate slurry to a separation stage. In the separation stage, the lithium nitrate may be substantially removed from the lithium oxide. For example, the separation stage may produce lithium oxide crystals.

For example, in some embodiments, the separation stage may comprise a liquids removal stage in which the lithium nitrate is substantially removed as a liquid from the lithium oxide solids, thereby producing lithium oxide crystals. For example, the liquids removal stage may comprise a screw-press.

In some embodiments, the lithium oxide crystals may be passed to a slaking stage. In the slaking stage, a controlled amount of water may be added to the lithium oxide crystals and a solution comprising lithium hydroxide monohydrate may thereby be produced. The solution comprising lithium hydroxide monohydrate may constitute a product of the process.

In some embodiments, the solution comprising lithium hydroxide may be subjected to a crystallisation stage (e.g. to produce a purer form of lithium hydroxide monohydrate). In the crystallisation stage, the solution of lithium hydroxide may be concentrated and crystallised to form crystalline lithium hydroxide monohydrate.

In some embodiments, the crystallised lithium hydroxide monohydrate may be separated from solution, thereby producing a substantially liquid-free crystallised lithium hydroxide product. For example, the separation may be achieved by centrifugation. The resultant lithium hydroxide monohydrate crystals may constitute a product of the process.

In some embodiments, the lithium nitrate liquor removed from the lithium oxide during the separation stage may be collected for further processing. For example, the further processing may comprise the addition of a carbonate compound to the lithium nitrate liquor (e.g. in a lithium carbonate precipitation stage) such that the lithium may react with carbonate, thereby producing lithium carbonate. The further processing may be performed under conditions that promote the precipitation of lithium carbonate.

In some embodiments, the lithium carbonate precipitate may be separated from solution. For example, the separation may be achieved by using a dewatering centrifuge. The lithium carbonate precipitate may constitute a product of the process.

In some embodiments, the solution separated from the lithium carbonate precipitate may be recycled as an alkali solution. The alkali solution may be used in a process stage of the reaction of the lithium-containing metal silicate with nitric acid. The alkali solution may be used as a neutralising solution.

In some embodiments, the carbonate compound may comprise sodium carbonate and/or potassium carbonate, such as can arise by adding sodium carbonate or potassium carbonate as the carbonate compound.

In some embodiments, the solution separated from the crystallised lithium hydroxide monohydrate may be passed to said carbonate compound further processing. For example, the separated solution may be passed to the lithium carbonate precipitation stage.

In some embodiments, the first thermal treatment procedure may comprise a two-stage thermal treatment. The two-stage thermal treatment may comprise a first heating stage in which the solution comprising lithium nitrate is heated to near-boiling to remove water and nitric acid (when present). The two-stage thermal treatment may further comprise a second heating stage in which a resultant near-boiling slurry of lithium nitrate is heated to a temperature of about 400° C. to melt the lithium nitrate in the slurry. Typically, because these stages operate at different temperatures, the stages (e.g. vessels) are separated. However, the stages may be performed in a single vessel operated under different conditions.

In some embodiments, the first thermal treatment procedure may produce a vapour stream comprising water and nitric acid (when present). The vapour stream may be collected and condensed. For example, the condensed vapour stream may provide process water and/or a dilute nitric acid solution.

In some embodiments, the temperature within the molten lithium nitrate in the second thermal treatment procedure may be about 600° C. Such temperatures may cause molten lithium nitrate to decompose into lithium oxide and oxides of nitrogen. The gaseous stream which comprises oxides of nitrogen may be collected and e.g. passed to a nitric acid production process. The nitric acid can be recycled for extracting more lithium from a lithium silicate mineral feedstock to the process.

In some embodiments, the solution comprising lithium nitrate that is passed to the first thermal treatment procedure may be substantially free of contaminants. For example, the lithium nitrate solution may have been treated in accordance with the purification procedures as set out in WO2017/106925.

For example, the solution comprising lithium nitrate that is passed to the first thermal treatment procedure may be produced by an extraction process in which a lithium-containing metal silicate may be reacted with nitric acid. The extraction process may comprise mixing the silicate mineral with the nitric acid. The extraction process may also comprise subjecting the mixture to a leaching process having conditions such that the lithium values in the silicate mineral may be leached into an aqueous phase as lithium nitrate.

The extraction process may further comprise passing the leach solution through to a solids-liquids separation stage to remove remaining solids.

The extraction process may still further comprise optionally heating the separated leach liquor to distil off water and nitric acid as a vapour stream. The water and nitric acid vapour stream may be collected and used in the regeneration of nitric acid. The nitric acid can be recycled for extracting more lithium from the lithium silicate mineral feedstock.

The extraction process may additionally comprise subjecting the leach liquor to a series of reaction conditions such that contaminants may be substantially precipitated from the liquor. The extraction process may finally comprise passing the solution through a filtration stage to remove precipitates, thereby producing a substantially contaminant free solution comprising lithium nitrate which may then be passed to the first thermal treatment procedure.

In some embodiments, the nitric acid generated from the vapour stream of the second thermal treatment procedure may form at least a portion of the nitric acid mixed with the silicate mineral in the extraction process.

In some embodiments, the lithium-containing metal silicate may comprise spodumene ($LiAlSi_2O_6$). The lithium-containing metal silicate may also comprise any of a range of other lithium-containing silicate minerals including but not limited to petalite $LiAlSi_4O_{10}$, cucryptite $LiAlSiO_4$, amblygonite $(Li,Na)AlPO_4(F,OH)$, and various minerals in the mica group including lepidolite $K(Li,Al,Rb)_3(Al,Si)_4O_{10}(F,OH)_2$ and zinnwaldite $KLiFeAl(AlSi_3)O_{10}(OH,F)_2$. The lithium-containing metal silicate may also comprise the lithium-boron mineral jadarite $LiNaSiB_3O_7(OH)$ or also written as $Na_2O \cdot LiO \cdot (SiO_2)_2 \cdot (B_2O_3)_3 \cdot H_2O$ Also disclosed herein, in a second aspect, is a system for producing a lithium product from a solution comprising lithium nitrate. As above, the lithium product produced by the system can include lithium nitrate, lithium oxide, lithium carbonate, lithium hydroxide, and lithium metal (amongst other products comprising lithium). The system comprises one or more heated vessels in which the solution comprising lithium nitrate is able to be heated to an extent whereby water and nitric acid (when present) may be removed as vapour and a resultant lithium nitrate-rich crystal slurry may form a molten liquid.

The system may also comprise a further-heated vessel in which the molten liquid may be heated to substantially decompose lithium nitrate to lithium oxide.

In some embodiments, the further-heated vessel may be configured as a flotation cell. In the further-heated vessel thereby configured, as the lithium nitrate is decomposed, the lithium oxide may float, thereby producing an overflow of lithium oxide and lithium nitrate slurry, and an underflow of lithium nitrate. The overflow may be passed to a solids-liquid separation stage.

In some embodiments, the further-heated vessel may produce a gaseous stream comprising oxides of nitrogen. The further-heated vessel may also be sealed to prevent such gases from escaping into the atmosphere. In some embodiments, the further-heated vessel may be heated indirectly, such as by electrical induction.

In some embodiments, the solids-liquids separation stage may comprise a screw press in which the lithium oxide may be substantially separated from the lithium nitrate.

In some embodiments, the one or more heated vessels may comprise an evaporator. In the evaporator, the solution comprising lithium nitrate may be heated so as to cause evaporation of water as vapour along with nitric acid (when present) and an over-saturated solution of lithium nitrate may thereby be produced.

In some embodiments, the one or more heated vessels may further comprise a melting vessel to which the saturated to over-saturated solution of lithium nitrate may be passed. In the melting vessel, the over-saturated solution of lithium nitrate may be heated to melt the lithium nitrate. The melting vessel may be heated directly, or indirectly, such as by electrical induction.

As above, the one or more heated vessels may comprise an evaporator that is separate to the melting vessel. However, in some embodiments, evaporation and melting may be performed in a single vessel that is operated under different conditions.

In some embodiments, the system may further comprise a nitric acid plant. The gaseous stream comprising oxides of nitrogen produced mainly by the further-heated vessel may be passed to the nitric acid plant to thereby produce nitric acid. As above, the nitric acid can be recycled for extracting more lithium from the lithium silicate mineral feedstock.

In some embodiments, a condenser may be arranged to collect and condense vapour from the one or more heated vessels and, when present, from the evaporator.

In some embodiments, the system may further comprise apparatus arranged to produce a crystalline lithium hydroxide product from the lithium oxide produced by the further-heated vessel.

In some embodiments, the system may further comprise apparatus arranged to produce a lithium carbonate product from the lithium nitrate-containing underflow. The apparatus may also be arranged to produce a lithium carbonate product from the lithium nitrate produced by the solids-liquid separation stage.

BRIEF DESCRIPTION OF THE DRAWINGS

Embodiments of a process and system will now be described, by way of example only, with reference to the following drawings in which.

DETAILED DESCRIPTION

Figure 1:
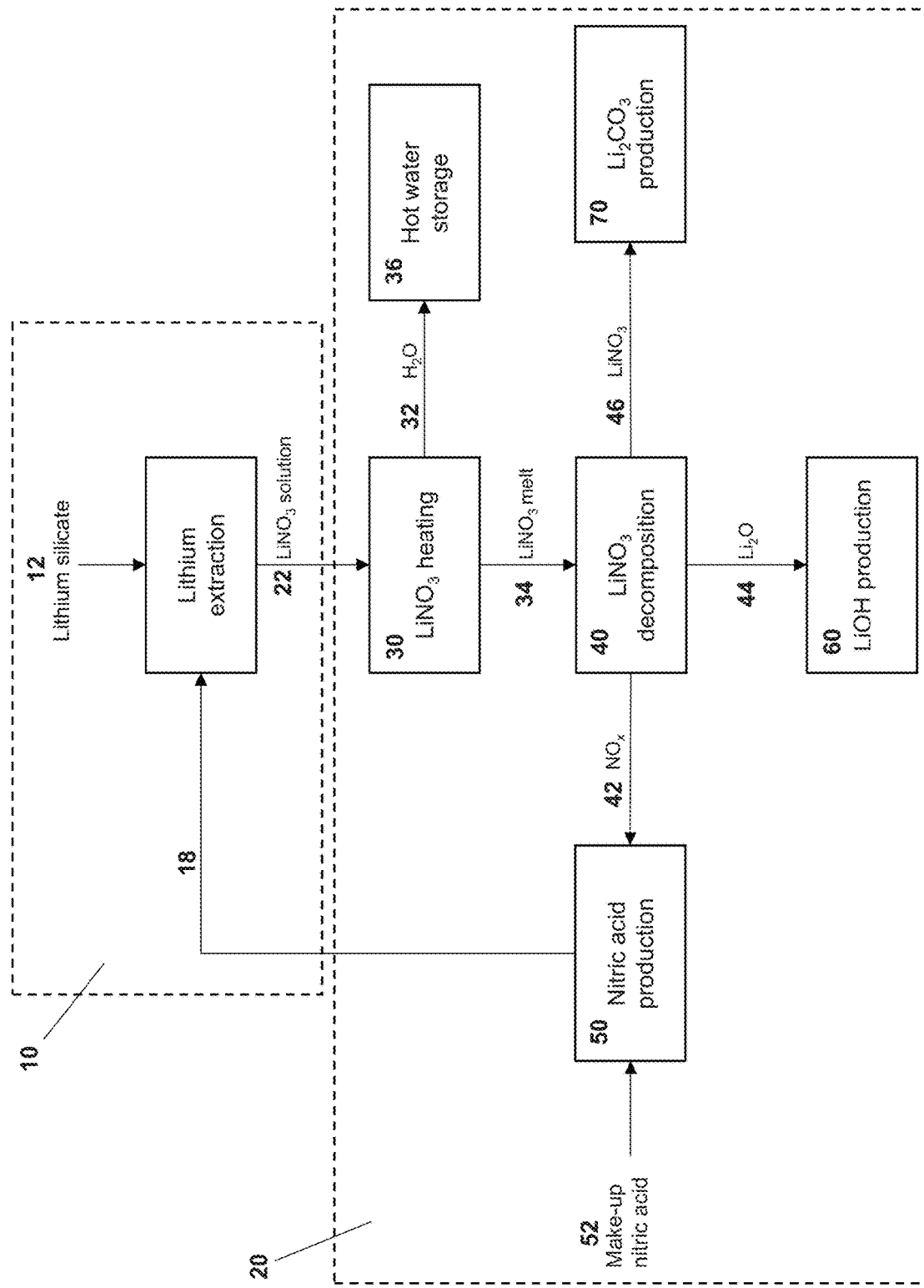
FIG. 1 is a generalised block flow diagram of the overall process for recovering lithium products from a lithium-containing silicate mineral.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

The following description discloses an embodiment of a process and system for recovering lithium products from a solution comprising lithium nitrate. From the solution comprising lithium nitrate, at least three lithium products can be produced (lithium oxide, lithium hydroxide and lithium carbonate), as well as nitric acid. The process and system are designed to be appended to an upstream process in which lithium is leached from a lithium-containing metal silicate to form the solution comprising lithium nitrate. An example of this upstream process is described below with reference to FIGS. 8 & 9. The process and system have advantages over the prior art in that the lithium nitrate does not need to be crystallised prior to the production of lithium products.

FIG. 1 is a concept flow diagram, set out in simple block diagram form, of a process 10 for lithium extraction in which a solution comprising lithium nitrate 22 is produced from a lithium-containing metal silicate 12 and nitric acid 18. The process 10 of lithium extraction and production of the purified lithium nitrate solution 22 is illustrated and described in more detail below with reference to FIGS. 8 & 9.

Appended to the lithium extraction process 10 is a process 20 for recovering lithium products from the purified lithium nitrate solution 22. The process 20 is described in more detail below, with reference to FIGS. 2 to 7.

Typically, the process 10 for extracting lithium from a lithium-containing metal silicate using nitric acid will be the first stages of the process as outlined in the applicant's process as set forth in WO2017/106925, the relevant contents of which are incorporated herein by reference. In this regard, after initial purification of the solution comprising lithium nitrate, the solution is passed to the first thermal treatment stage of process 20—that is, instead of being passed to the crystalliser of WO2017/106925.

However, it will be appreciated that a solution comprising lithium nitrate can be produced by other means. For example, a solution comprising lithium nitrate can be produced by chemically treating salar brines comprising lithium by using the method disclosed in the applicant's co-pending patent WO 2020/107074, the relevant contents of which are incorporated herein by reference.

It should be understood that the processes 10 and 20 illustrated in FIGS. 1 to 9 can be modularised/containerised, whereby each module/container can define distinct stage(s) of the overall process. Further, each module/container can, largely, be fabricated and assembled in a factory environment, and can then be transported to the site of a new lithium refinery and assembled there quickly and conveniently. This represents an attractive option as lithium ore refineries are typically located in remote areas (e.g. next to their host mines and concentrators). In remote areas, refinery construction costs are typically much higher than they are in more densely populated areas. Further, in remote areas, securing qualified operators is more of a challenge and expensive; and construction times can be delayed for extended periods by inclement weather. On the other hand, the advantages of constructing refineries adjacent to or otherwise close to the host lithium ore mines and concentrators are clear, at least for the processes 10 and 20 of FIGS. 1 to 9. For example, this uniquely and essentially obviates the need for transporting large quantities of expensive and hazardous chemicals from mines/concentrators to remote processing sites, and also obviates transporting to a suitable, benign disposal site, the largely valueless chemical by-products of their use. As well, the only residue from the processes 10 and 20 of FIGS. 1 to 9 are the leached spodumene concentrates, an inert, free-draining, finely divided solid able to be conveniently returned to the host mine-site, where it may be blended with the typically much larger quantities of mine concentrator rejects also produced.

By way of example, at pilot scale, a modularised/containerised plant can comprise up to four such modules. The process equipment can be installed on three skids, each having the floor area of a standard '20-foot' (TEU) shipping container. TEU dimensions can be such that all process equipment is less than 2.8 metres in height, allowing for road transport. Equipment can be fixed to an acid-resisting FRP base/floor. The base frame can be formed into a bund to contain any spills and leaks. The floor can be reinforced to take the operating weight and normal stresses of equipment operation.

Modules/containers can be assembled in sequence. For example, this can allow upstream processes (e.g. process stage 10 of FIGS. 8 & 9) to be evaluated and their performance demonstrated while subsequent modules/containers are built. A first module/container may even be ready to operate within three months of the decision to proceed with construction, with further modules/containers able to follow in sequence (e.g. at 4-6 week intervals) so that the total process can be demonstrated within 6 months of a decision to proceed with its construction.

Production of Purified Lithium Nitrate-Rich Pregnant Leach Solution (PLS)

Figure 6:
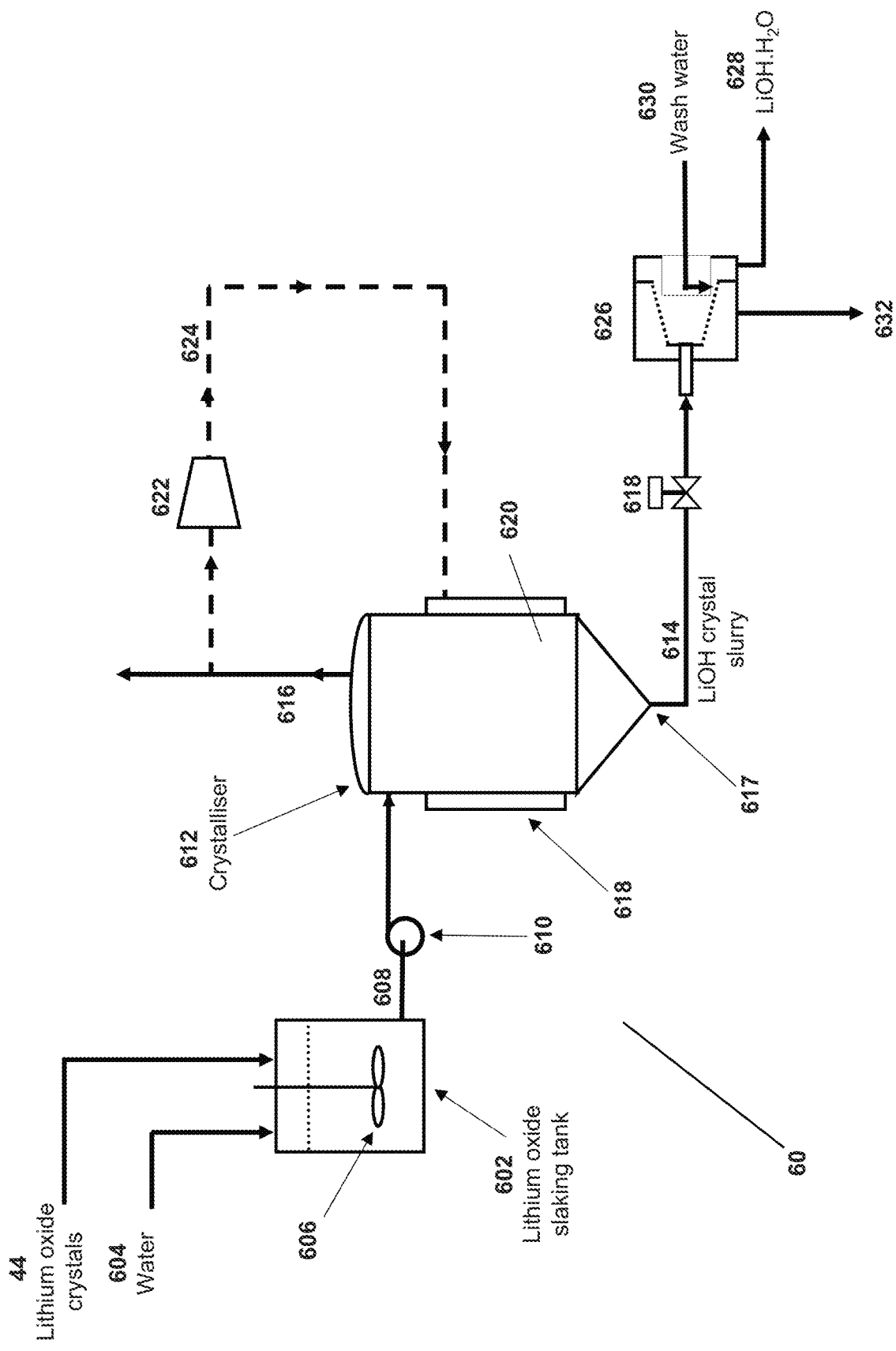
FIG. 6 is a schematic of a process flow diagram of a lithium hydroxide production area in which lithium oxide is converted to lithium hydroxide monohydrate.
Figure 7:
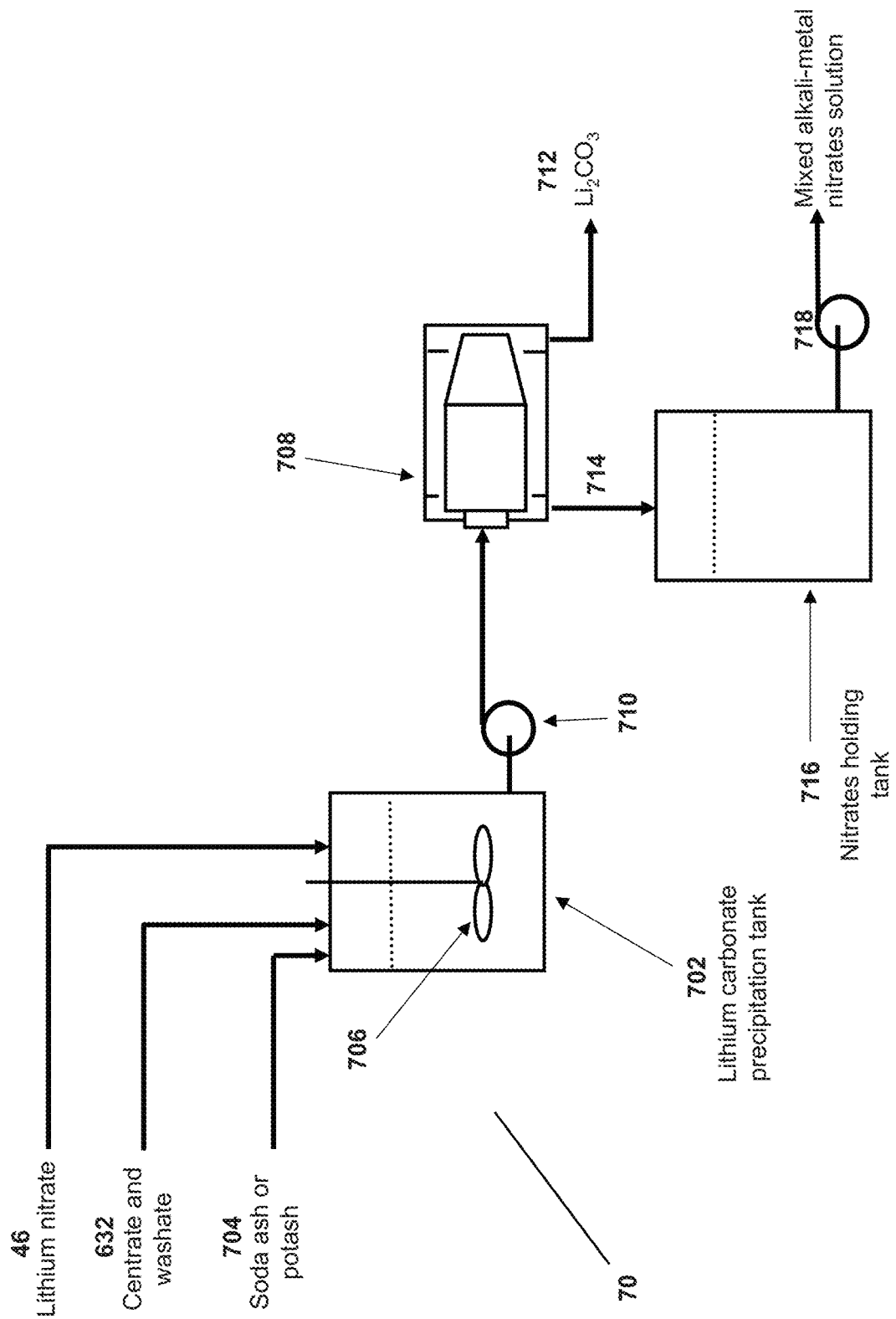
FIG. 7 is a schematic of a process flow diagram of a lithium carbonate production area in which lithium nitrate is converted to lithium carbonate.
Figure 8:
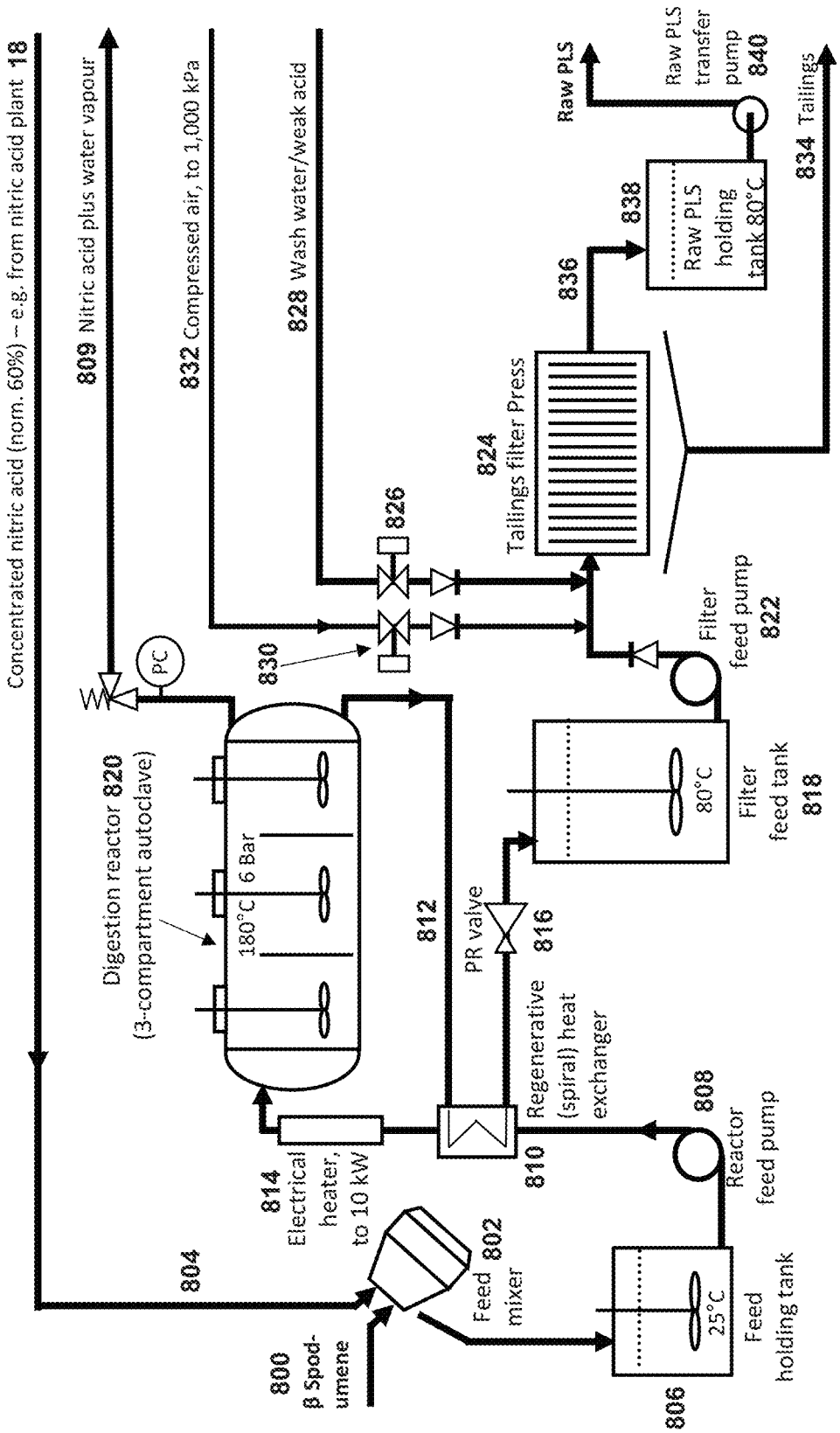
FIGS. 8 & 9 are schematics of process flow diagrams in which a purified lithium nitrate is produced from a lithium-containing silicate mineral, the purified lithium nitrate being passed to the process of FIG. 2.
Figure 9:
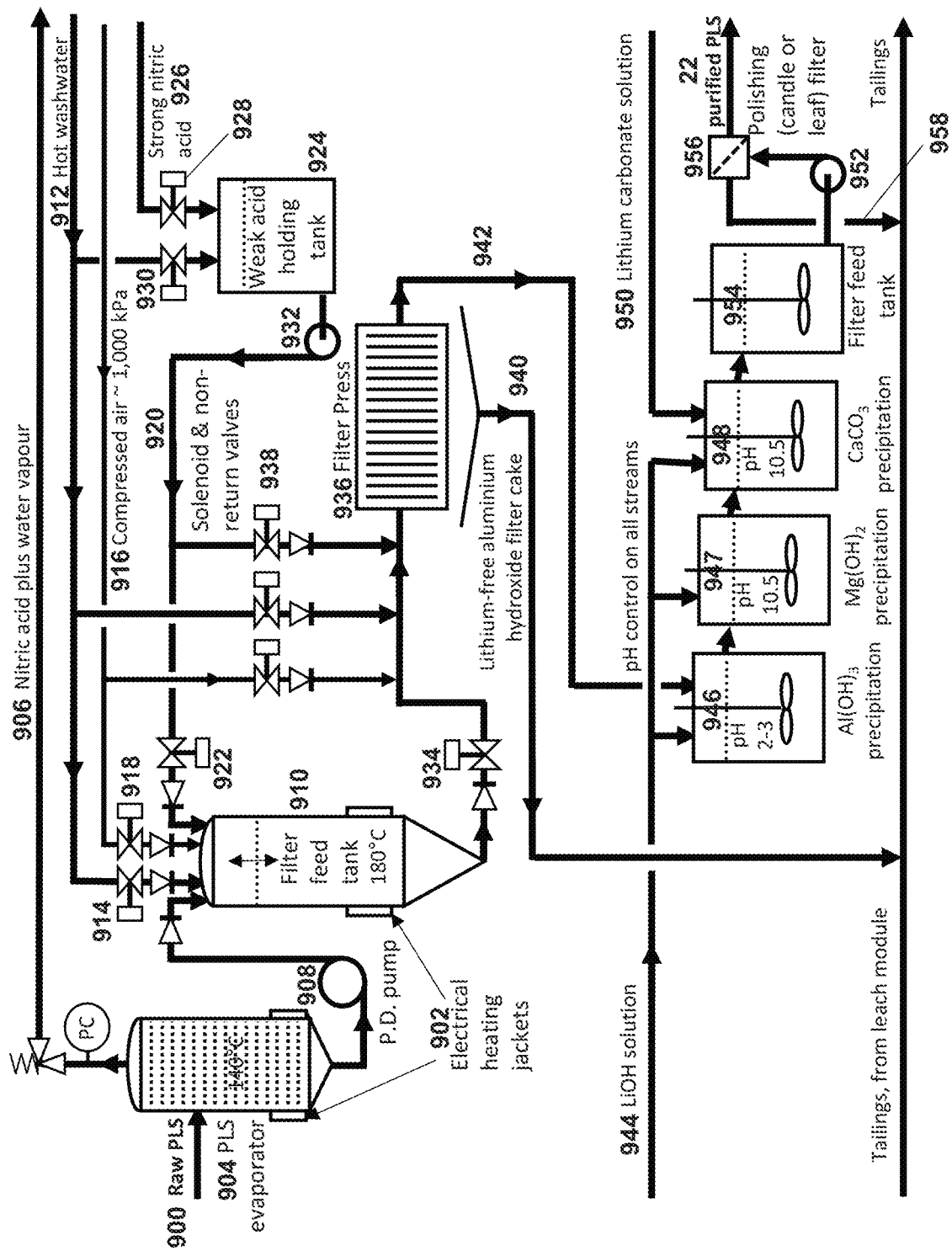

As outlined in WO2017/106925, and as illustrated in further detail in FIGS. 1, 8 and 9, to produce a purified lithium nitrate solution 22 for use in the process 20 of FIGS. 2 to 7, a metal silicate comprising lithium 12, such as α spodumene, is first activated such as by calcination, thereby producing primarily β spodumene. The β spodumene (FIG. 8) forms the starting material 800 for the process shown in FIGS. 8 & 9.

Spodumene Digestion in Nitric Acid (Module 1 of Pilot-Scale Plant)

The β spodumene 800 is fed to a feed mixer 802 where it is mixed with a stream of concentrated nitric acid 804, nominally 50% but ranging between 28% and 68%, and in excess (e.g. this is shown as stream 18 in FIG. 1). The nitric acid 804 can be produced in the nitric acid production plant 50 (described below).

As soon as a batch is mixed in the feed mixer 802, the contents of the feed mixer are turned out into a feed holding tank 806, which takes the form of a covered, polypropylene tank fitted with an agitator to prevent the feed materials from segregating. In tank 806, the contents are mixed and maintained at ambient temperatures (e.g. ~25° C.). In the process 10, the tank 806 can serve to provide a flow 'buffer' whereby the contents thereof can be intermittently topped-up but then continuously fed to a digestion reactor 820, in which the β spodumene is 'digested'—i.e. leached—with the nitric acid.

In the digestion reactor 820 the mixture of nitric acid and β spodumene is subjected to elevated temperatures and pressures to cause the lithium to be released from the β spodumene matrix and form a solution comprising lithium nitrate and other impurities. Other contaminants present in the β spodumene which may be leached concomitantly with lithium to form part of the solution can comprise iron, aluminium, silica, potassium, and sodium.

The contents of tank 806 are pumped from the tank to the digestion reactor 820 via a suitable reactor feed pump 808. The pump 808 can comprise a peristaltic pump that is fitted with a variable-speed drive to regulate the flow of the β spodumene/nitric acid slurry to the digestion reactor 820. The pump 808 typically pressurizes the slurry to 6-8 Bar gauge and forces it through a regenerative spiral heat exchanger 810 (a suitable spiral heat exchanger is that supplied by Alfa Laval, in titanium). In heat exchanger 810, the hot slurry stream 812 that discharges from the digestion reactor 820 preheats the β spodumene/nitric acid slurry, such that the slurry can reach temperatures in the vicinity of 180° C. maximum when it passes into the digestion reactor 820. A supplementary electrical heater 814 can be provided. Typically, the electrical heater 814 is only used during start-up and process upsets. In any case, the heat exchanger 810, and optionally the electrical heater 814, combine to raise slurry feed temperatures to the digestion reactor 820 to the 180° C. maximum.

The digestion reactor 820 as depicted comprises a three-compartment autoclave (and substantially manufactured of titanium). During normal operation, roughly one-third of the total volume of reactor 820 is dedicated to the gas phase. The autoclave digestion reactor 820 can also be operated with a substantially lower liquid: gas phase volume, to allow for exploration of lower detention times. The nominal detention time of slurry in the autoclave digestion reactor 820 is up to 60 minutes. Correct filling of reactor 820 is ensured by continuously monitoring the operating weight of the reactor and, where this deviates from a set point, the speed of the reactor feed pump 808 is adjusted accordingly.

In operation of the digestion reactor 820 there is a progressive decrease in free nitric acid concentration in the aqueous phase of the reactor contents moving along its length, declining from its feed end. The operation of digestion reactor 820 is fully continuous. During operation, excess water vapour and nitric acid are distilled off as a stream 809 which can be passed to e.g. the nitric acid plant 50 for regeneration of concentrated nitric acid for reuse in the digestion reactor 820. Additionally or alternatively, the stream 809 can be condensed to provide (e.g. a weak acid) process water, the use of which is referred to hereafter.

The reaction times for leaching of lithium values in the digestion reactor 820 are short. For example, extraction of lithium values from calcined spodumene concentrates typically exceed 95% within 15 minutes, as secured by using a substantial excess of nitric acid. Alternatively, the digestion reactor 820 may be operated with longer reaction times to facilitate secondary reactions, such as the auto-hydrolysis of ferric nitrate. Significantly, under conditions marked by a large excess of nitric acid, the equilibrium of ferric nitrate auto-hydrolysis (desirably) remains to the left:

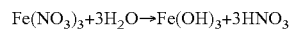

$$Fe(NO_3)_3 + 3H_2O \rightarrow Fe(OH)_3 + 3HNO_3$$

However, depending on how much nitric acid is added in excess of the stoichiometric quantity required to leach lithium values from the spodumene concentrates, and how much of this excess acid is used to leach other metals into solution as nitrates, notably iron and aluminium, the overall free nitric acid concentration may fall to the extent that the equilibrium in the above reaction may begin to shift to the right, leading to the formation of in particular, a precipitate of ferric hydroxide, even as there are still significant quantities of free nitric acid present in solution.

The hot slurry stream 812 that exits the digestion reactor 820 is rapidly cooled counter-currently in the regenerative spiral heat exchanger 810 to below 100° C. by the incoming digestion reactor feed slurry. This cooling further arrests digestion of impurity-metal values in the leached spodumene by the surplus nitric acid.

The slurry exiting the spiral heat exchanger 810 flows through a pressure-reduction control valve 816 to lower its pressure to ambient, then flows into a covered and agitated filter feed tank 818. The effective volume of feed tank 818 is sufficient to hold up to two hours' flow of reacted slurry under the operating parameters of the process. From filter feed tank 818, the partially cooled, ambient pressure, reacted slurry is pumped via a tailings filter feed pump 822 to a tailings filter press in the form of a plate-and-frame filter press 824.

At the beginning of each filtration cycle, the filter feed pump 822 is turned on to fill the plate-and-frame filter press 824. Completion of filling is established once the back-pressure in the filter press 824 rises to be essentially equal with that within the entry line to the filter feed pump 822, whereupon the filter feed pump turns off. Using the plate-and-frame filter press 824, the solids present in the partially cooled product slurry from the digestion reactor 820 are filtered to form a filter cake in the filter press.

Next, a solenoid valve 826 that admits hot wash water 828 is opened for a desired washing time to wash the filter cake. The quantity of wash water employed will be set by the extent of filter cake washing required, but typically at least an equal mass of wash water is employed as there is filter cake. On completion of washing, the wash water supply valve 826 is closed and a solenoid-controlled air-flow valve 830 is opened to allow compressed air 832 to pass into the filter press 824 and thereby purge excess moisture from the filter cake. Various control protocols may be followed, but a preferred filtration approach is to continue the wash and/or air-drying cycles until sufficient slurry has accumulated in the filter feed tank 818 for a next complete filtration cycle. At the end of the final drying cycle, the air-flow valve 830 is closed, and the filter press 824 is opened for cake discharge. The low-moisture filter cake (leached spodumene concentrates) discharges from the filter cloths to be collected in a hopper or other receptacle, and to thereby form a barren-residue/tailings stream 834. This can be subsequently disposed of (e.g. by using it as an ingredient for the production of cement). At least a portion of the wash water stream 828 can also be reclaimed for use elsewhere in the process.

The filtrate of the filter press 824 is periodically discharged as a pregnant leach solution (PLS) stream 836, being a substantially clear solution comprising lithium nitrate, aluminium nitrate, and lesser quantities of the nitrates of iron, the alkali metals sodium and potassium, and calcium, and even smaller quantities of a range of other metals, plus nitric acid, resulting in a pH number below zero. The stream 836 is collected in a raw PLS holding tank 838 (e.g. another polypropylene tank fitted with a dust cover). From tank 838, the stream is periodically transferred by a raw PLS transfer pump 840 to a purification stage of the process (described below with reference to FIG. 9).

Purification of Pregnant Leach Solution (Module 2)

Referring now to FIG. 9, the raw PLS (pregnant leach solution) 900 comprising lithium nitrate and other impurities is pumped via transfer pump 840 to a series of purification and neutralisation stages. In these stages, reagents are added to promote the precipitation of base metals and to neutralise remaining nitric acid. The solid precipitates are removed by passing the solution and precipitates to a solids-liquids separation stage. The ultimate result of these purification and neutralisation stages is a substantially contaminant free solution 22 comprising lithium nitrate. The solution 22 is also substantially free of nitric acid. The typical concentration of remaining contaminants in and the suitability of the solution comprising lithium nitrate as a feed for the process 20 is also described in greater detail below with reference to Example 1.

As above, the filtrate 838 from the tailings filter press 824 (i.e. raw PLS) is pumped from the Raw PLS holding tank 838 by the transfer pump 840 as a hot (near-boiling) aqueous solution of lithium nitrate, along with the nitrates of other metals also leached by the nitric acid from the mineral: aluminium, some residual iron and other transition metals, calcium, magnesium, sodium, potassium and the phosphate ion, plus the residual free nitric acid surplus to that required to convert the various cations leached from the concentrates to nitrate salts, along with the wash water added in the tailings filter press 824.

This hot Raw PLS 900 enters an electrically heated PLS evaporator 904 (i.e. heated via electrical heating jackets 902) where most of the volatiles—i.e. water and nitric acid, are boiled off as a stream 906. The PLS evaporator 904, which in a commercial-scale plant may be a multiple-effect evaporator comprised of three or more effects, or a multi-stage flash system with 12 or more stages, is made large enough to contain up to one hour's production of concentrated liquor to allow time for the hydrolysis of most of the aluminium and ferric iron values to proceed largely to completion, as set forth below.

The PLS evaporator system 904 is operated to the point where what remains is a saturated solution of mostly lithium nitrate, plus crystals of the same, and that forms a dense but pumpable slurry. Even though evaporation is undertaken at essentially ambient pressures, because of the substantial boiling-point elevation due to the highly concentrated, even saturated nitrate solutions, temperatures in the final saturated solution can exceed 180° C. before the slurry ceases to be pumpable. Test work demonstrates that, before this point is reached, almost all free nitric acid is boiled off because of the highly deliquescent behaviour of lithium nitrate: the lithium nitrate's powerful attraction for water allows nitric acid to be preferentially boiled off. In practice, the PLS evaporator 904 is operated such that the solubles concentration in the PLS does not proceed past the point where it ceases to be a pumpable slurry, nor much past the point where crystals of lithium nitrate begin to form (e.g. when the temperature of the boiled-down liquor reaches around 180° C.).

The combined nitric acid-rich vapour phase 906, boiled off in the PLS evaporator at a temperature around 120° C., flows at near-ambient pressure to a nitric acid production stage 50 (located e.g. in a Module 3—described below). Embodiments involving evaporation systems such as multiple effect, or multi-stage flash, may lead to production of a not just one nitric acid-rich vapour phase, but several such phases, which may range from essentially pure water vapour to concentrated nitric acid vapour. These separate phases may be condensed separately, or in combination with others, and recycled to various parts of the total process 10 and 20 including directly to the Feed mixer 802, to the Nitric acid plant 50 or to various holding tanks each to store process water or various-strength nitric acid solutions.

The stripping of most of the unreacted (surplus) nitric acid from the liquid phase in the evaporator system 904 reduces the pH concentration (i.e. raises the pH number) of the PLS, but only to around pH 1-2. This allows the auto-precipitation of most of the iron and aluminium values extracted from the spodumene concentrate and taken into solution as nitrates by the nitric acid in the digestion reactor 820. More specifically, the equilibrium in the following reversible reaction shifts to the right (that for ferric iron set out above is seen to be essentially the same):

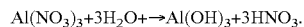

$$Al(NO_3)_3 + 3H_2O + \rightarrow Al(OH)_3 + 3HNO_3.$$

This equation is a simplification; the aluminium hydroxide contains substantial lithium values, around 5% of the values recovered from the β spodumene in the digestion reactor 820, to the point where the 'hydroxide' is perhaps best described as a hydrated lithium aluminate with a formula approaching: $LiAlO(OH)_2$.

In the process, this lithium is also sought to be recovered. In this regard, the saturated liquor/crystal slurry from the PLS evaporator, including its burden of iron and (mainly) aluminium hydroxide crystals, is pumped by a suitable positive-displacement pump 908 to an enclosed agitated storage vessel in this embodiment, a filter feed tank 910. The filter feed tank 910 is maintained at a pressure of 6-8 Bar and temperature of ~180° C. The filter feed tank 910 is operated along with a flow of sufficient hot wash water 912 such as to dilute the PLS liquor to re-dissolve any lithium nitrate crystals and ensure no crystallization of lithium nitrate or other nitrate salt can occur at temperatures down to 80° C. The flow of wash water 912 is controlled via a solenoid valve and non-return valve pairing 914 to maintain the nitric acid concentration in the aqueous phase below 5% $HNO_3$. Pressurizing the blend in tank 910 allows boiling-point temperatures to be maintained above 180° C. The pressure in tank 910 can also be controlled/regulated via a compressed air line 916 (compressed up to ~1,000 kPa), controlled via solenoid valve and non-return valve pairing 918.

As required, a weak nitric acid feed stream 920 can also be diverted to the tank 910 via a solenoid valve and non-return valve pairing 922 to maintain the nitric acid concentration in tank 910 at desirable levels below 5%. This weak nitric acid is itself made and held in a holding tank 924 and can be prepared by feeding a strong nitric acid stream 926 (produced elsewhere in the process—e.g. in plant 50) via valve 928. The strong nitric acid 926 is mixed in the holding tank 924 with a portion of the hot wash water 912, the feed of the hot water portion being controlled via valve 930. The weak nitric acid 920 produced is pumped from the holding tank 924 via pump 932.

Under the high-temperature and pressure conditions maintained in the pressurized filter feed tank 910 the dilute nitric acid (remaining from the PLS evaporation step/stage 904) leaches the lithium values in the aluminium hydroxide precipitate to form more lithium nitrate in solution. The detention time provided in the filter feed tank 910 is around 2 hours, sufficient for further aluminium values to be precipitated and for lithium values to be fully leached from all of these.

The liquid phase from the filter feed tank 910 is flowed under pressure, via a non-return and control valve pairing 934, to a further filter press 936 (other filtering or arrangements including centrifugation are also possible). In a similar manner to filter press 824, the filter press 936 is fed by hot wash water from the stream 912 and compressed air from the line 916, via respective solenoid and non-return valve pairings 938. Weak nitric acid 920 for filtrate washing (i.e. flushing the filter cake of remaining nitrate values) can also be fed to the filter press 936 via its respective solenoid and non-return valve pairing 938.

The filter cake 940 from the filter press 936 is periodically discharged from the filter cloths to be collected in a hopper or other receptacle, and to again thereby form a barren-residue/tailings stream. This stream 940 can be combined with a tailings residue from the leaching stage (Module 1, FIG. 8) and can be subsequently disposed of similarly.

The filtrate stream 942 from filter press 936 is passed on to subsequent purification stages. As illustrated, the purification stages comprise a series of three stirred precipitation tanks, which are arranged for sequentially removing residual aluminium, etc. values by adding lithium hydroxide solution 944 (i.e. from downstream product processes).

A first such precipitation tank 946 is configured for $Al(OH)_3$ precipitation. A second (next) precipitation tank 947 is configured for $Mg(OH)_2$ precipitation. A third (next) precipitation tank 948 is configured for $CaCO_3$ precipitation.

The filtrate stream 942 is passed to the first precipitation tank 946, where the solution pH is raised to around 2-3, and whereupon any residual aluminium values precipitate as the hydroxide (because of the high lithium nitrate concentration, the hydroxide precipitates as a filterable crystalline solid rather than a gel). The resultant supernatant solution is then passed to the second precipitation tank 947, where the solution pH is raised to around pH 9.5 to precipitate magnesium values as insoluble magnesium hydroxide, according to:

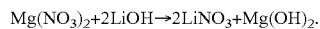
$$Mg(NO_3)_2 + 2LiOH \rightarrow 2LiNO_3 + Mg(OH)_2.$$

If desired (or as necessary), residual calcium is removed by precipitating it as insoluble calcium carbonate (calcite) in the third precipitation tank 948, but this time by also adding a correct quantity of lithium carbonate 950 (i.e. from downstream product processes). The lithium carbonate stream 950 causes the following reaction:

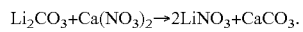
$$Li_2CO_3 + Ca(NO_3)_2 \rightarrow 2LiNO_3 + CaCO_3.$$

The passage of the liquor through the precipitation tanks 946, 947, 948 is caused by a polishing filter feed pump 952 (i.e. pump 952 draws the liquor through the tanks 946, 947, 948). The precipitated solids that accumulate in the liquor as it passes through all three tanks (and as pumped via the polishing filter feed pump 952) is passed into a fourth stirred tank, namely, a filter feed tank 954. By this stage, the precipitated solids are present in low quantities, and are removed, and washed, by passing the liquor from the filter feed tank 954 to a suitable polishing filter 956. Again, because of the high concentrations of lithium and nitrate ions, all solids that precipitate do so as dewaterable crystalline solids rather than gels. The solids filtered out by the polishing filter 956 are collected and fed as stream 958 to the combined tailings stream from the leaching stage and the filter press tailings 940, for disposal.

It is noted that the option exists of operating the four tanks (i.e. the three precipitation tanks 946, 947, 948 and the single filter feed tank 954) as pairs: the first two tanks to precipitate aluminium values, the second two tanks to precipitate magnesium values.

The purification stages 946-948 produce a purified lithium nitrate solution 22. Whilst this solution could comprise a product of the process, typically, the purified lithium nitrate solution 22 is further treated to produce lithium oxide as well as downstream products, including lithium hydroxide, lithium carbonate and lithium metal.

Process (20)—Recovering Lithium Products from the Purified PLS (FIGS. 1-7).

The following section describes a preferred embodiment of the total process, one in which crystallization is avoided all the way from production of the raw PLS to the production of solid lithium oxide. This overall description therefore represents an alternative to the art described in the U.S. Pat. Nos. 10,131,968, and 10,883,156 insofar as the production of a high purity lithium oxide intermediate product required the crystallization of pure crystalline lithium nitrate from the purified PLS, to reject alkali metals that remain after all Group 2 and 3 metals have been removed.

Referring to FIG. 1, the solution comprising lithium nitrate 22 purified to the extent it contains no metals other than the alkali metals, passes to a first heating procedure 30, which is described in more detail below with reference to FIG. 3. In the heating procedure 30, water 32 is evaporated from the solution. The evaporated water 32 is collected and condensed and stored 36 for reuse in the process. Remaining nitric acid vapour can be entrained with the evaporated water 32. In the heating procedure 30, the resultant lithium nitrate-rich crystal slurry is heated to form a lithium nitrate melt 34 (molten liquid).

The molten lithium nitrate melt 34 is passed to a second heating procedure 40, which is described in more detail below with reference to FIG. 4. In the second heating procedure 40, the lithium nitrate melt 34 is more vigorously heated to cause the lithium nitrate to substantially decompose into lithium oxide 44 and a gaseous stream 42 comprising oxides of nitrogen (NOx) plus some oxygen.

The gaseous NOx stream 42 formed from the decomposition of lithium nitrate in the second heating procedure 40 is collected and passed to a nitric acid production facility 50, which is described in more detail below with reference to FIG. 5.

As the lithium nitrate decomposes in the second heating procedure 40, the formed lithium oxide tends to float to the top, forming an overflow of lithium oxide-in-lithium nitrate slurry, filled with bubbles of the other decomposition product: the blend of the gases nitric oxide, nitrogen dioxide and oxygen. The overflowing slurry first enters a circumferential launder wherein essentially all of the bubbles break, releasing the gaseous products to leave a two-phase slurry of solid lithium oxide crystals in molten lithium nitrate. This slurry flows to a solids-liquid separation system, in which the un-decomposed lithium nitrate liquor is separated from the solid lithium oxide by (in an embodiment) using a screw press. The screw press 'squeezes' the lithium nitrate-rich liquor from the lithium oxide to produce a lithium oxide product 44 in the form of a cake. The lithium nitrate-rich liquor is returned to the Decomposition vessel 404, to be recycled.

Since this lithium nitrate-rich liquor also contains the nitrates of sodium and potassium (and perhaps small quantities of the nitrates of rubidium and caesium, to the extent these normally rare alkali metals were contained in the spodumene concentrates) it follows that these alkali-metal nitrates will accumulate in the contents of the Decomposition vessel 404, their concentration relative to lithium nitrate steadily increasing as more and more lithium nitrate is decomposed. In practice this process may reach a limit, as the lithium oxide cake (in this embodiment) from the screw press will inevitably include some of these alkali-metal nitrates in the interstices between the compacted lithium oxide crystals forming the cake. Eventually a situation will arise where the quantities of such alkali metal nitrates being removed from the circulating lithium nitrate liquor (Decomposition vessel to Screw press liquor and back to the Decomposition vessel) will match the rate at which these alkali metal nitrates enter this circulating flow as fresh feed to the Decomposition vessel.

It follows that the lithium oxide cake formed as described is not a pure product, rather it is a 'raw' lithium nitrate. Further purification is needed before it can be deemed acceptable as a feed for lithium battery manufacture.

Mention has been made of previous patents awarded to the inventor for example U.S. Pat. Nos. 10,131,968 and 10,883,156 that describe art for production of high-purity lithium oxide as a key process intermediate or final product. They include an additional process step: crystallization of the partly purified pregnant leach solution (PLS), i.e. the lithium nitrate solution so purified that the only impurity elements present in this PLS are sodium and potassium (and perhaps rubidium and caesium if present in the spodumene concentrates feed to the refinery) also present as nitrates. But while significantly simpler than the crystallization processes that other lithium mineral refining processes must undergo for example, crystallisation of the sodium sulfate by-product from using sulfuric acid rather than conveniently recyclable nitric acid as in the inventor's relevant patents and applications, crystallization is a complex and expensive process not best undertaken at remote mine sites.

A feature of this application is the production of battery-grade lithium chemicals with a minimum of crystallization stages, in particular, the production of pure crystals of lithium hydroxide monohydrate with just one crystallization stage: that for the final lithium hydroxide monohydrate product.

Another feature of this application is enabling the convenient division of the total process of refining lithium-rich minerals to battery-grade lithium chemicals into two locations: the production of a raw lithium oxide product at or near the site of the mine/concentrator that is the source of refinery feed (for example, 6% lithium oxide content spodumene concentrates, often abbreviated to SC6) and a 'finishing' stage located at or near the lithium battery manufacturing facility, where the raw lithium oxide is converted to pure, battery-grade lithium hydroxide (or, if required, to carbonate, by resorting to art set out inter alia in the inventor's U.S. Pat. No. 10,131,968).

This is described in more detail below with reference to FIG. 4.

The high concentration of elemental lithium in even a 'raw' solid lithium oxide as produced by this version of the process 20, minimises transport costs per tonne of elemental lithium, particularly in comparison with transporting spodumene concentrates, of which 94% are waste rock. Such waste rock inevitably presents a disposal problem for the customer/battery manufacturer. In a transport context, lithium oxide represents the most convenient, least-cost option: one tonne of pure lithium oxide contains as much elemental lithium as 18 or more tonnes of SC6, allowing also for losses in processing.

Whether the processes upstream of production of the solid lithium oxide product 44, and a lithium hydroxide production area 60, are essentially adjacent, or separated, perhaps by thousands of kilometres, the processes involved are described in more detail below with reference to FIG. 6.

In the lithium hydroxide production area 60, the lithium oxide is mixed with sufficient water (slaked and dissolved) to form a solution of lithium hydroxide. As described below with reference to FIG. 6, the lithium hydroxide is then passed to a crystalliser in which water is evaporated, thereby producing a lithium hydroxide monohydrate crystal slurry. A dewatering centrifuge is used to produce a substantially liquids-free lithium hydroxide monohydrate product.

In an embodiment, in the lithium nitrate decomposition section 40 most of the lithium values are converted to solid lithium oxide, so this lithium nitrate-rich liquor (which may contain the nitrates of sodium and potassium), represents but a small proportion of the total lithium nitrate fed to the decomposition reactor vessel 404.

In an embodiment the lithium nitrate contained in the residual liquor 46 may undergo further processing stages 70 to form a lithium carbonate product. Reasons for this further processing are firstly, to provide an additional marketable product, and secondly to minimise the quantities of lithium values remaining in what becomes a blend of mainly lithium nitrate with sodium and potassium nitrates.

In the lithium carbonate production stage 70, which is described in more detail below with reference to FIG. 7, soda ash and/or potash are added to the expressed residual lithium nitrate liquor 46. This results in the precipitation of sparingly soluble lithium carbonate. A dewatering centrifuge is used to remove liquor from the lithium carbonate, thereby producing a substantially liquids-free lithium carbonate product.

Figure 2:
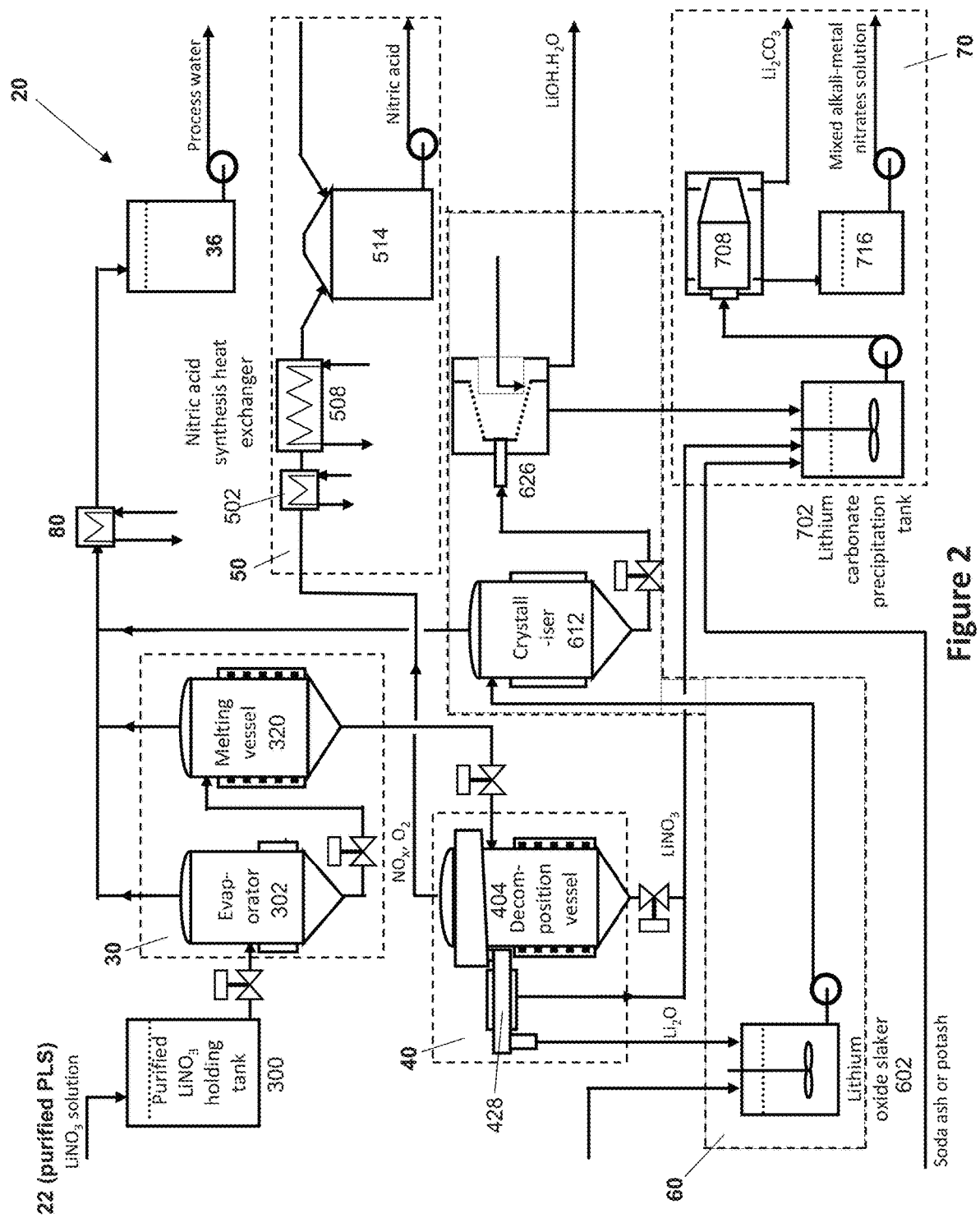
FIG. 2 is a schematic of a process flow diagram of a process by which lithium is recovered from a solution comprising lithium nitrate.

Specific details of the process 20 for accomplishing each of the operational stages 30 through 70, as outlined above, will now be described. FIG. 2 provides an overall schematic of the process 20. FIG. 2 illustrates in overview: the lithium nitrate first heating procedure 30 according to the present disclosure; the lithium nitrate second heating procedure 40 according to the present disclosure; nitric acid production 50; lithium hydroxide monohydrate production 60; and lithium carbonate production 70.

Each of FIGS. 3 to 7 respectively provide a more detailed breakdown of these individual process operations 30 to 70 within the process 20.

Example 2 further provides preliminary calculations and design parameters for a pilot-scale plant.

Figure 3:
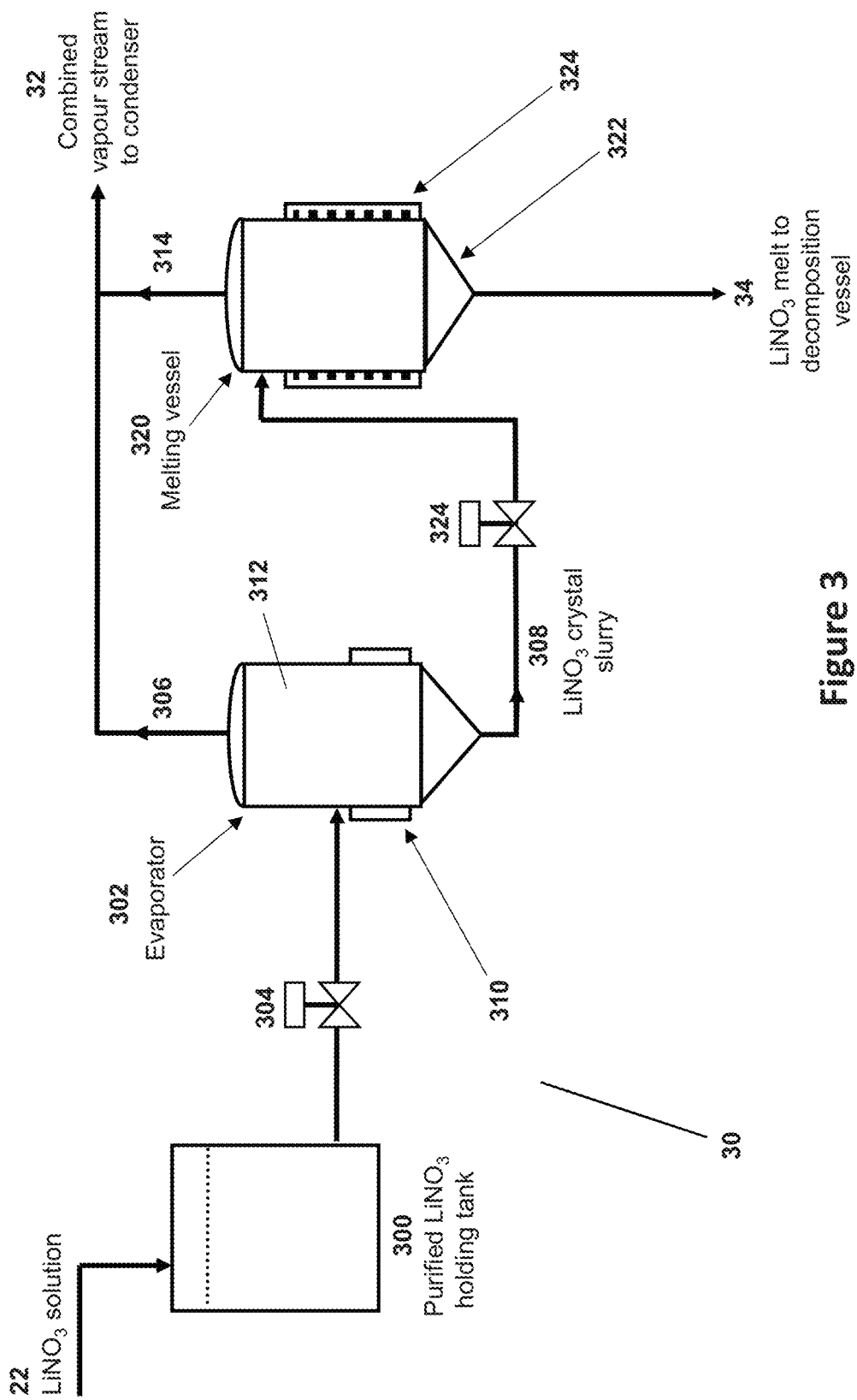
FIG. 3 is a schematic of a process flow diagram of a first thermal treatment procedure.

Lithium Nitrate First Heating Procedure 30 (FIG. 3)

Referring now to FIG. 3, a solution 22 comprising lithium nitrate (e.g. a purified PLS such as may be obtained by reacting a lithium-containing metal silicate with nitric acid in the lithium extraction process 10), is pumped into a holding tank 300 of the lithium nitrate first heating procedure 30. The lithium nitrate first heating procedure 30 is a two-stage process comprising an evaporator 302 and a melting vessel 320.

The holding tank 300 serves as a feed tank to the evaporator 302. The solution 22 comprising lithium nitrate flows from the holding tank 300 and into the main compartment 312 of the evaporator 302 when the control valve 304 is opened. The valve 304 can be partly or fully closed when the evaporator 302 needs to be isolated from the holding tank 300, for example if maintenance is required or in case of equipment failure or if flow to the evaporator 302 needs to be reduced.

In the evaporator 302, the solution 22 comprising lithium nitrate is heated. The evaporator 302 operates at a temperature near the boiling point of the solution 22, at the given operating pressure of the evaporator 302. The evaporator 302 can be configured to operate either at elevated pressure or under a vacuum. At the temperature near the boiling point of the solution 22, water is evaporated. The evaporated water is removed as a vapour stream 306. The vapour stream 306 may contain very low concentrations of nitric acid, for example, when nitric acid is still present in the solution 22 comprising lithium nitrate.

The evaporator 302 also comprises an external jacket 310 which surrounds a main compartment 312 of the evaporator 302. Steam is fed into the external jacket 310. The steam in the external jacket 310 condenses, thereby releasing energy. The energy released from the condensing steam 310 is transferred to the solution in the main compartment 312, thereby causing the solution to heat up and water to evaporate. Condensed steam from the evaporator jacket 310 may be collected for use either as process water or returned to the boiler for reuse in the evaporator 302.

As water and nitric acid (when present) continue to be evaporated in the evaporator 302, an over-saturated solution of lithium nitrate is thereby produced. The over-saturated solution of lithium nitrate comprises a fraction of lithium nitrate crystals in a slurry which collects at the bottom of the evaporator. This slurry 308 of lithium nitrate crystals is pumped from the evaporator 302 by a pump (not shown).

Depending on the volume of solution comprising lithium nitrate to be processed, the evaporator 302 can comprise either a single-effect evaporator (for a smaller volume, such as in a pilot plant) or a multiple-effect evaporator (for a larger volume, such as in a commercial-scale system).

In a single-effect evaporator configuration, only one such evaporator 302 is present, with the water vapour 306 produced by the evaporator 302 immediately collected. In a multiple-effect evaporator configuration, there are several such evaporators 302 configured in series, with the solution comprising lithium nitrate incrementally concentrated as it passes through the series of evaporators. Water vapour produced from the first evaporator in the series is used as the steam stream in the next evaporator in the series and so forth. Small volumes of make-up steam to each evaporator may be required. The final evaporator in the series produces the vapour stream 306.

The evaporator 302 (either single or multiple effect) typically comprises a mechanical vapour recompression system in which the vapour 306 is recompressed in a compressor. The recompressed vapour is then used as the steam to the external jacket 310. A small volume of make-up steam is also generally required. The use of mechanical vapour recompression can significantly reduce the overall fresh steam requirement, reducing the duty required by the boiler. This can provide significant savings in terms of both the capital and ongoing costs of the process and system particularly if electricity is inexpensive and generated from renewable sources e.g. hydroelectricity.

A control valve 324 between the evaporator 302 and the melting vessel 320 allows the evaporator 302 and the melting vessel 320 to be isolated from each other. When the valve 324 is closed, the slurry 308 cannot pass from the evaporator 302 to the melting vessel 320. When the valve 324 is open, the slurry 308 of lithium nitrate crystals is able to be moved, such as by pumping, from the evaporator 302 to the melting vessel 320.

The melting vessel 320 operates at a temperature of about 400° C. which is above the melting point of lithium nitrate. The melting vessel 320 is enclosed in a jacket 324 which indirectly heats the melting vessel 320 using electricity. The vessel 320 is typically heated by induction to the temperature of about 400° C.

The high temperature of the melting vessel 320 causes the crystals of lithium nitrate present in the slurry to melt. Other salts present in the slurry (by this stage of the process only nitrates of other alkali metals notably sodium and potassium, with traces of rubidium and caesium if present in the spodumene concentrates and, possibly, some calcium) may also melt if the melting point of the salt is less than 400° C. A molten liquid is thereby produced that comprises the melted lithium nitrate and melted other salts. The molten liquid comprising melted lithium nitrate and melted other salts 34 collects at the bottom 322 of the melting vessel 320. The molten liquid 34 is passed to the second thermal treatment procedure 40.

Water remaining in the slurry 308 evaporates in the melting vessel 320, along with any remaining nitric acid, producing a vapour stream 314. Vapour 314 produced by the melting vessel 320 is collected and combined with the vapour 306 from the evaporator 302 (when mechanical vapour recompression is not part of the system) to form a combined vapour stream 32. The combined vapour stream 32 is collected and passed to a condenser 80 (FIG. 2). The combined vapour stream 32 is condensed in the condenser 80 and stored in a storage tank 36 (FIG. 2). The recovered water in storage tank 36 is used as process water elsewhere in the process—for example as wash water, as feed to a boiler, etc. The condenser 80 may employ either chilled water or cool water, such as from a cooling tower, as the second cooling stream in the condenser 80. Energy is transferred from the condensing combined vapour stream 32 to the chilled water or cool water stream, resulting in a sensible heat change within the chilled water or cool water.

Figure 4:
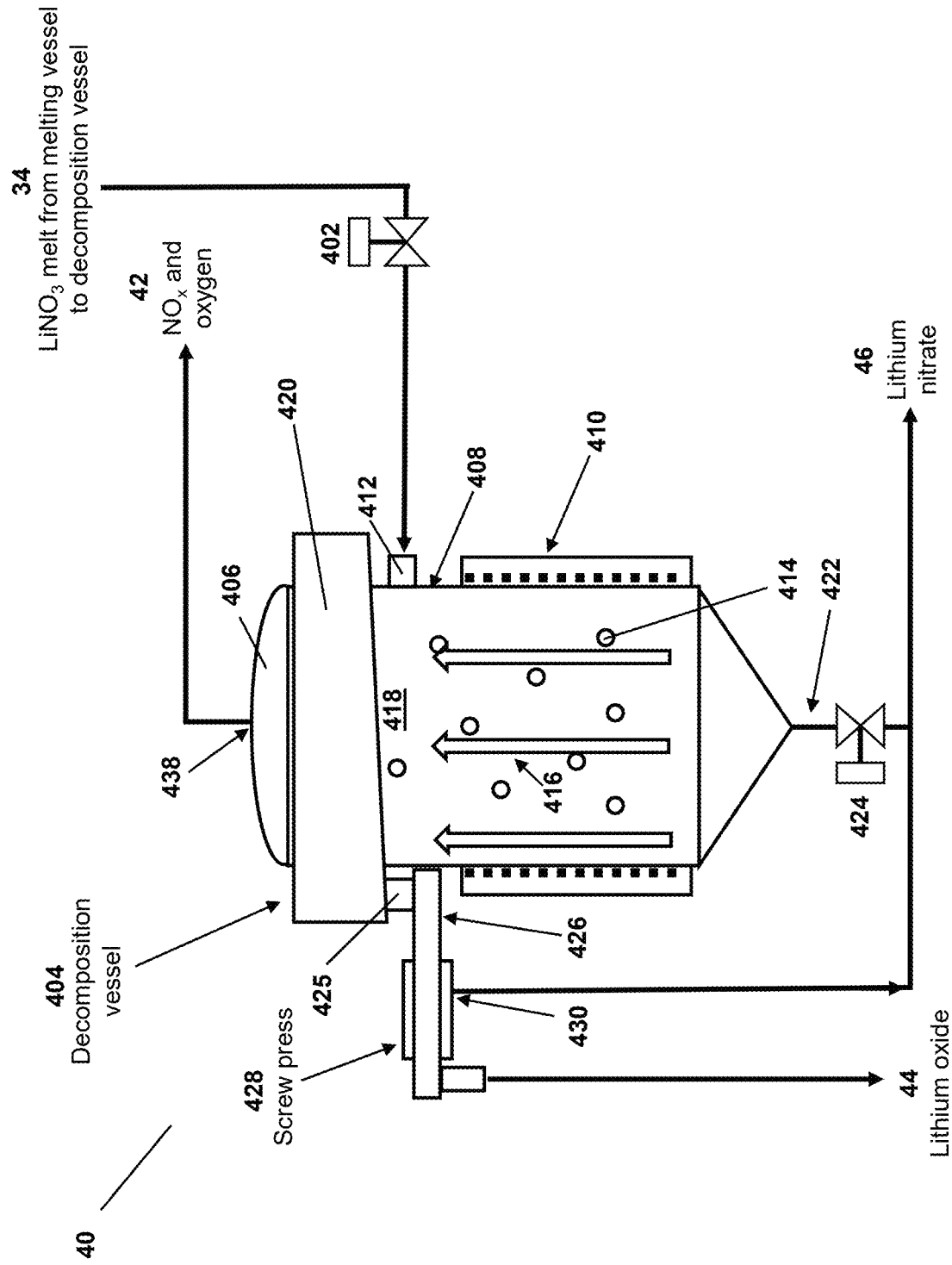
FIG. 4 is a schematic of a process flow diagram of a second thermal treatment procedure.

Lithium Nitrate Second Heating Procedure 40 (FIG. 4)

As illustrated in FIG. 4, the molten liquid 34 comprising lithium nitrate and melted other salts from the first thermal treatment procedure 30 is passed to the second thermal treatment procedure 40.

A control valve 402 is placed between the melting vessel 320 and the second thermal treatment procedure 40 such that, when the valve 402 is partly or fully closed, molten liquid 34 cannot pass from the melting vessel 320. This allows isolation of the melting vessel 320 from the second thermal treatment procedure 40, for example when maintenance is required or to stop or control flow to the second thermal treatment procedure 40.

When the valve 402 is opened, the molten liquid 34 passes into the decomposition vessel 404, typically towards an upper end thereof. The decomposition vessel 404 is enclosed by means of a domed roof 406 to help prevent leakage of toxic gases. The inside surface 408 of the decomposition vessel 404 is fully lined with periclase (dead-burned magnesium oxide) tiles. Periclase is a suitable material for lining the decomposition vessel 404 as it is refractory and devoid of amphoteric properties, i.e. it does not react with lithium oxide. The decomposition vessel 404 operates at a temperature of about 600° C.—that is, around the decomposition temperature of lithium nitrate. A jacket 410 surrounds the decomposition vessel 404. The jacket 410 indirectly heats the decomposition vessel 404 by electrical induction, thereby maintaining the temperature of about 600° C.

The contents (i.e. the molten liquid 34) of the decomposition vessel 404 are maintained at the temperature of about 600° C., promoting the decomposition of lithium nitrate into lithium oxide crystals according to the following reaction:

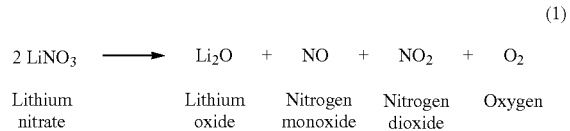

$$2\ \text{LiNO}_3 \longrightarrow \text{Li}_2\text{O} + \text{NO} + \text{NO}_2 + \text{O}_2 \quad (1)$$

Lithium nitrate → Lithium oxide + Nitrogen monoxide + Nitrogen dioxide + Oxygen

Typically, more NO is produced than $NO_2$. Both NO and $NO_2$ are collectively referred to as $NO_x$.

Although a substantial amount of the lithium nitrate present in the molten liquid 34 decomposes in the decomposition vessel 404, some melted lithium nitrate will remain. As set forth below, the remaining lithium nitrate can be removed as an underflow 422 from the decomposition vessel 404 by the careful opening of a control valve 424.

The decomposition vessel 404 is configured to simultaneously act as a flotation cell, albeit a flotation cell which is designed to operate at high temperatures and able to handle the chemicals involved in the process. The molten liquid feed 34 enters the decomposition vessel 404 towards the upper end of the decomposition vessel 404 via a feed port 412.

The lithium oxide crystals formed during the decomposition of lithium nitrate are less dense than the remaining lithium nitrate. The lithium oxide crystals will therefore tend to move upwards 416 (i.e. 'float') through the vessel 404 to the top of the vessel 418.

As the lithium nitrate decomposes, the $NO_x$ and oxygen gases form bubbles 414 in the vessel 404, thereby mimicking the bubbles introduced by aeration in a traditional flotation cell. The bubbles 414 move upwards 416 through the vessel to the top of the vessel 418. The upwards movement of the bubbles 414 also helps to promote the separation of the less dense lithium oxide crystals.

Due to the upwards movement of the lithium oxide crystals and the $NO_x$ and oxygen bubbles 414, a froth of lithium oxide crystals in lithium nitrate-rich bubbles forms on top of the remaining lithium nitrate slurry. The froth forms the overflow stream of the decomposition vessel 404 and overflows into a peripheral collection launder 420. The remaining lithium nitrate slurry forms the underflow 422 which can be removed from the decomposition vessel 404 by opening valve 424.

The collection launder 420 directs the overflow of lithium oxide crystals in lithium nitrate-rich bubbles to an exit port 425 and pipe 426. As the overflow is directed into the exit port 425 and pipe 426, the bubbles burst, forming a concentrated slurry of lithium oxide crystals in molten lithium nitrate.

The cover 406 of the decomposition vessel 404 extends over the collection launder 420 and exit port 426, ensuring the $NO_x$ and oxygen are not able to escape into the atmosphere. Rather, the gaseous $NO_x$ and oxygen stream 42 is directed into an outlet pipe 438. The gaseous $NO_x$ and oxygen stream 42 is passed to the nitric acid production facility 50 (FIGS. 1 & 5).

The concentrated slurry of lithium oxide crystals in molten lithium nitrate is directed into a screw press conveyor 428. Depending on the capacity required, one or more screw press conveyors operating in parallel can be used.

In the screw press conveyor 428, molten lithium nitrate is squeezed out of the lithium oxide crystals. The residual molten lithium nitrate collects at a bottom outlet 430 of the screw press conveyor 428. The molten lithium nitrate collected from the screw press conveyor is combined with the lithium nitrate underflow 422 from the decomposition vessel 404, thereby forming a combined lithium nitrate stream 46. The combined lithium nitrate stream 46 is pumped to a lithium carbonate precipitation stage of the lithium carbonate production section 60 (FIGS. 1 & 6).

As the molten lithium nitrate is squeezed out of the lithium oxide crystals, the lithium oxide crystals are compacted into a mass of lithium oxide crystals essentially devoid of liquid phase. The lithium oxide crystals 44 are collected from an upper end of the screw press conveyor 428.

The screw press conveyor 428 is a variant of the type widely used for expressing edible oil from oil-seeds, with modifications as necessary such that it can withstand the process conditions. The rotor is of high-chromium steel covered with periclase applied using plasma techniques and the stator is made of porous, sintered periclase. Other surfaces are lined internally with periclase tiles as required, including (but not limited to) where surfaces may come into contact with the molten liquid.

In one version of the process, the lithium oxide crystals 44 are the final product. Lithium oxide has 46.5% lithium by weight. This represents the highest content of elemental lithium compared to other lithium products (such as hydroxide, carbonate) and is significantly higher than the lithium content of the original ore. The cost of transporting a lithium oxide product, on a lithium basis, is relatively cheap. For example, it may be economically air-freighted such as from a remote operating site.

The lithium oxide crystal product 44 is also the ideal precursor for production of lithium metal. Depending on the purity of the initial solution comprising lithium nitrate, the lithium oxide crystal product may not be able to produce battery-grade lithium hydroxide monohydrate by merely adding water—that is, a lithium hydroxide monohydrate crystallisation step can be employed. By ending the process with a lithium oxide crystal product, capital and operating costs can be reduced (i.e. no crystalliser required) in the process to this point.

Further, the process naturally lends itself to being divided into two parts. In the first part, a near-pure lithium oxide is produced which, because of its high lithium content, invites construction of most of the refinery adjacent to the host lithium mine/concentrator. Freight charges to then transport the lithium values as lithium oxide to a battery plant are particularly low, due to the high lithium content by weight. In the second part, the balance of the process (being the crystallisation of lithium hydroxide monohydrate) may then be undertaken at the battery plant or a secondary refinery.

In the process as illustrated, typically the lithium oxide crystals are further processed to produce crystallised lithium hydroxide monohydrate. In this version of the process, the liquid-free lithium oxide crystals 44 are passed into the lithium hydroxide production section 60 (FIGS. 1 & 6).

Figure 5:
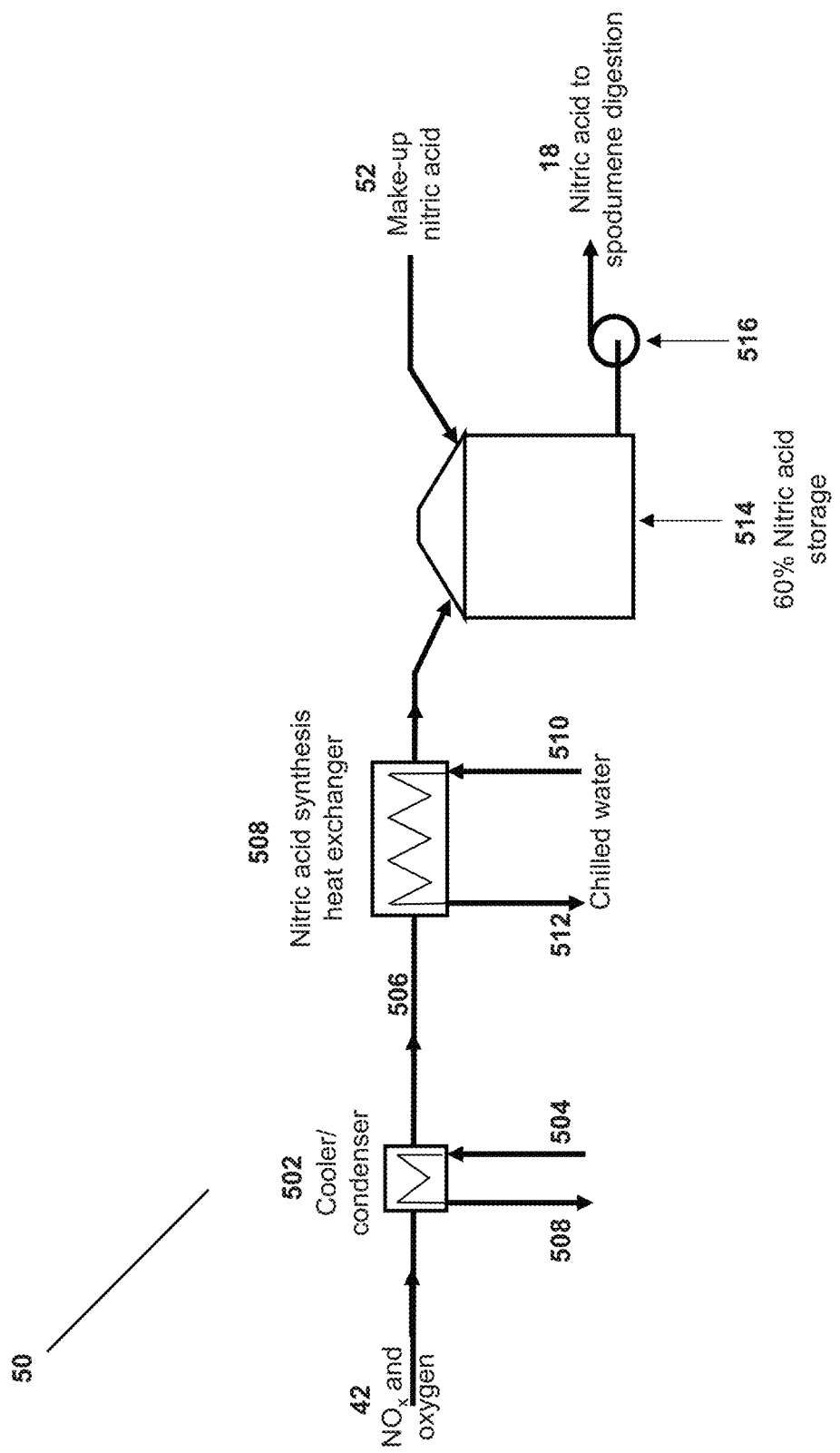
FIG. 5 is a schematic of a process flow diagram of a nitric acid production facility.

Nitric Acid Production 50 (FIG. 5)

As illustrated in FIG. 5, the gaseous $NO_x$ and oxygen stream 42 produced by the decomposition of lithium nitrate in the decomposition vessel 404 is passed to a nitric acid production facility 50. The gaseous stream can also comprise water vapour and traces of nitric acid.

The gaseous stream 42 first passes through a cooler/condenser 502. In the cooler/condenser 502, cool water 504 is passed through counter-currently to the gaseous stream 42. Energy (heat) is transferred between the gaseous stream 42 and the cool water 504, thereby producing a cooled gaseous stream 506 and warm water 508. A part or all of the water and nitric acid present as vapour in the gaseous stream 42 may be condensed in the cooler/condenser 502.

The cooled gaseous/liquid stream 506 (which may also comprise some condensed water and acid) next passes through a nitric acid synthesis heat exchanger 508. In the heat exchanger 508, chilled water 510 is passed counter-currently to the cooled gaseous stream 506. Energy (heat) is transferred between the cooled gaseous stream 506 and the chilled water 510, thereby further condensing and cooling the gases in the gaseous stream to ambient temperatures. The chilled water 510 is concurrently heated. The heated chilled water 512 is returned to be used as makeup water for the chiller.

As the cool gaseous stream 506 is further cooled and condensed, the following reactions occur:

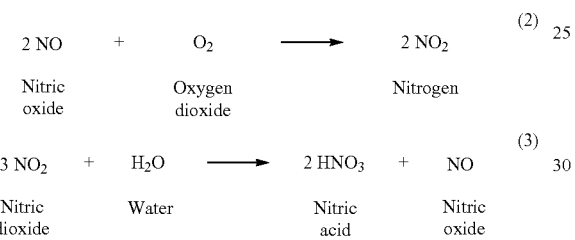

The NO that forms in reaction (3) reacts with additional oxygen to form more NO₂ via the first reaction. Since the cooled gaseous stream 506 primarily comprises the reactants with very little diluting gas, reactions (2) and (3) proceed fast enough that nitric acid formation is essentially completed within the heat exchanger. Small quantities of oxygen gas may be added to maintain oxidising conditions within the heat exchanger.

The nitric acid formed from reaction (3) is transferred to a nitric acid storage tank 514. The nitric acid storage tank 514 is covered and gas-tight to prevent leakage of vapours into the atmosphere. Makeup nitric acid 52 is added to the storage tank 514 as needed to maintain an acid concentration of approximately 50% nitric acid (by weight) in the storage tank 514. Nitric acid 18 from the storage tank 514 is pumped by a pump 516 to the process 10 for generating a solution comprising lithium nitrate from the reaction of a lithium-containing metal silicate with the nitric acid.

Lithium Hydroxide Monohydrate Production 60 (FIG. 6)

Referring now to FIG. 6, the liquid-free lithium oxide crystals 44 (from the FIG. 4 process) i.e. from the screw press 428 are gravity fed into a lithium oxide slaking tank 602 of the lithium hydroxide production section 60 (FIGS. 1 & 6). Water 604 is also added to the slaking tank 602. The water 604 is usually demineralised water with very low impurity levels, thereby ensuring a high purity lithium hydroxide product can be obtained.

One option is to add sufficient water 604 to the slaking tank 602 such that an anhydrous lithium hydroxide product is produced. The process is therein terminated, and the anhydrous lithium hydroxide is sold as a final product. The lithium oxide crystals 44 react with the water 604 to produce anhydrous lithium hydroxide according to the reaction:

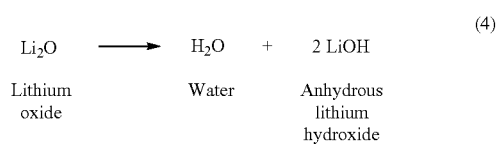

An advantage of terminating the process at such a lithium hydroxide product 608 is that the process is simpler and has a lower cost, since no further equipment or processing is required. The slaking is controlled so as to produce anhydrous lithium hydroxide with an exceptionally fine crystal size. The anhydrous lithium hydroxide product 608 contains approximately 29% elemental lithium, making it cheaper to transport on a lithium basis than the original ore. The anhydrous lithium hydroxide product 608 can therefore be economically transported elsewhere for further processing.

Typically, however, a stoichiometric excess of water 604 is added to the slaking tank 602. In the slaking tank 602, the lithium oxide crystals 44 react with the excess of water 604 thereby producing a solution of lithium hydroxide monohydrate, according to the reaction:

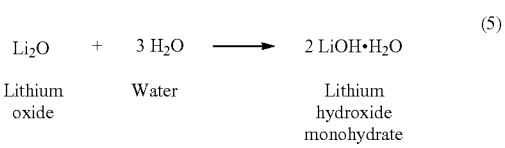

An excess of water 604 is also required to ensure a pumpable, solids-free solution of lithium hydroxide monohydrate 608 is produced. The slaking tank 602 further comprises an agitator 606 which promotes homogeneity within the slaking tank 602.

The solution of lithium hydroxide monohydrate 608 is pumped by pump 610 to the lithium hydroxide crystalliser 612. In the crystalliser 612, the solution is heated 618 to cause the evaporation of water, thereby forming a vapour stream 616 and a concentrated and crystallised lithium hydroxide monohydrate crystal slurry 614.

The vapour stream 616 can be combined with the combined vapour stream from the first thermal treatment procedure 316 (FIG. 3) and directed to the condenser 80. In the condenser 80 (FIG. 1), the vapour stream is condensed, thereby producing process water which is stored in a storage tank 36. The process water is reused elsewhere in the process, as required.

Depending on the volume of lithium hydroxide solution, the crystalliser 612 can either be an electrically heated evaporator or can be heated using steam. Typically, an electrically heated single-effect crystalliser 612 is used in smaller-scale operations—for example, in a pilot plant. The crystalliser 612 comprises a jacket 618. Electricity is supplied to the jacket 618 to thereby cause heating of the crystalliser 612.

For larger operations, a steam-heated crystalliser comprising mechanical vapour recompression will be used. When the crystalliser 612 is steam-heated, the crystalliser 612 also comprises an external jacket 618 which surrounds the main compartment 620 of the crystalliser 612. The external jacket 618 allows for steam to be fed into and flow through the external jacket 618. The steam in the external jacket 618 condenses, thereby releasing energy. The energy released from the condensing steam is transferred to the solution in the main compartment 620, thereby causing the solution to heat up and water to evaporate. Condensed steam from the crystalliser jacket 618 may be collected for use either as process water or returned to the boiler.

The vapour 616 is recovered and at least a portion thereof can be sent to a compressor 622. The compressor 622 increases the pressure of the vapour 616 thereby producing high pressure steam 624. The high-pressure steam 624 can be reused as the steam source in the external jacket 618 of the crystalliser 612. Small volumes of make-up steam to the circuit are typically required due to losses. However, the requirement for fresh steam is significantly reduced in a crystalliser fitted with mechanical vapour recompression. This likewise reduces the size of the boiler required in the plant, which provides significant savings in terms of both the capital and ongoing costs of the process/system.

The lithium hydroxide monohydrate crystal slurry 614 is discharged in a controlled manner from the bottom 617 of the crystalliser 612. The crystal slurry 614 passes to a dewatering centrifuge 626 when a control valve 618 is opened. When the valve 618 is closed, the crystalliser 612 is isolated from the dewatering centrifuge 626, and the crystal slurry 614 cannot flow to the dewatering centrifuge 626.

In the dewatering centrifuge 626, a lithium hydroxide monohydrate crystal product 628 is separated from the slurry. The lithium hydroxide monohydrate crystal product 628 is substantially free of liquor. The dewatering centrifuge 626 typically operates whereby the lithium hydroxide monohydrate crystal product 628 is able to be filtered and washed with warm wash water 630.

In the initial filtration stage 626, the liquid separated from the lithium hydroxide monohydrate crystal product 628 (the centrate) is collected and forms part of a combined recovered liquor stream 632.

During washing, interstitial liquor contained within the lithium hydroxide monohydrate crystal product 628 is substantially replaced with wash water. The interstitial liquor recovered as part of the wash cycle (the washate) is collected and forms another part of the combined recovered liquor stream 632.

The volume of wash water 630 added to the dewatering centrifuge 626 is based on the volume of liquor contained in the lithium hydroxide monohydrate crystal product 628 and the desired impurity content of the interstitial liquor contained within the lithium hydroxide monohydrate crystal product 628. Depending on the desired moisture content of the lithium hydroxide monohydrate crystal product 628, the lithium hydroxide monohydrate crystal product 628 may be further dried prior to packing and dispatch.

The combined recovered liquor stream 632 is a concentrated aqueous solution comprising lithium hydroxide, with minor quantities of sodium, potassium and lithium carbonates and nitrates. The combined recovered liquor stream 632 may be reused in several areas of the process as required. A first portion can be sent back to a purification stage of the initial lithium nitrate solution obtained from leaching β spodumene with nitric acid. A second portion can be recycled back into the lithium oxide slaking tank 602. A third portion can be sent to the lithium carbonate production area 70 (FIGS. 1 & 7).

Lithium Carbonate Production 70 (FIG. 7)

As indicated in FIG. 7, the residual stream 46 expressed from the screw press 430 still contains lithium nitrate (FIGS. 1 & 4). The lithium values contained in this stream are recovered as lithium carbonate. The stream is pumped to the lithium carbonate production section 70 where it enters the lithium carbonate precipitation tank 702.

The third portion of the combined recovered liquor stream 632 (FIG. 6) from the lithium hydroxide monohydrate production area 60 is also pumped to the lithium carbonate precipitation tank 702.

The lithium nitrate stream 46 from the screw press is a saturated solution of lithium nitrate plus sodium and potassium nitrates. Nitrates of rubidium and caesium may also be present, to the extent these alkali metals are present in the spodumene concentrates. Such a blend of primarily lithium, potassium and sodium nitrates, as anhydrous salts, may find application as a molten-salt heat storage and transfer medium in solar-thermal power plants. The presence of lithium values can lower the melting point of eutectic blends of sodium, potassium and lithium nitrates to below 100° C., while remaining stable at temperatures exceeding 500° C. Therefore, one option is to further concentrate the blended lithium nitrate 46 and recovered liquor 632 streams to form a mixed nitrate product.

Typically, however, the lithium nitrate stream 46 and recovered liquor stream 632 are further processed to recover the lithium values. This is done by precipitating the lithium as sparingly soluble lithium carbonate. To achieve this, a combination of soda ash ($Na_2CO_3$) and/or potash ($K_2CO_3$) 704 are added to the lithium carbonate precipitation tank 702. The tank 702 is continuously stirred by means of an agitator 706 to promote mixing between the lithium nitrate stream 432, the centrate/washate 632, and the added soda ash and/or potash 704.

As the streams are mixed in tank 702, the lithium nitrate present reacts with soda ash thereby forming lithium carbonate ($Li_2CO_3$) and sodium nitrate ($NaNO_3$) according to reaction (6). The lithium nitrate present also reacts with potash thereby forming lithium carbonate and potassium nitrate ($KNO_3$) according to reaction (7).

$$2LiNO_3 + Na_2CO_3 \rightarrow Li_2CO_3 + 2NaNO_3 \qquad (6)$$

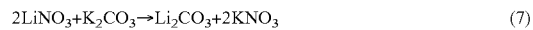

$$2LiNO_3 + K_2CO_3 \rightarrow Li_2CO_3 + 2KNO_3 \qquad (7)$$

The tank conditions (temperature, pressure, reagent addition) are selected so as to optimise the precipitation of the lithium carbonate formed by reactions (6) and (7) from solution. For example, since the solubility of lithium carbonate decreases with increasing temperature, the lithium carbonate precipitation tank 702 can be heated to increase the temperature of the contents, thereby increasing the mass of lithium carbonate precipitate formed in the lithium carbonate precipitation tank 702.

Lithium carbonate is a strong base. A portion 950 of the lithium carbonate slurry from the lithium carbonate precipitation tank 702 can be recycled back to the lithium extraction process 10 (FIGS. 1 & 9). This offsets the requirement for fresh base in the process.

In the purification stages of FIG. 9 (namely, tank 948) the lithium carbonate 950 is used to adjust the pH of the solution comprising lithium nitrate, thereby causing contaminants in solution to precipitate, and forming a solution comprising lithium nitrate substantially free of contaminants, which can then be passed to process 20.

Typically, however, most of the lithium carbonate slurry is pumped from the lithium carbonate precipitation tank 702 to a dewatering centrifuge 708 via slurry pump 710. The dewatering centrifuge 708 operates to remove liquor from the contents of the slurry, thereby producing a lithium carbonate product substantially free of liquor 712 and a centrate 714. The lithium carbonate product 712, which is of marketable purity or better, is dried, packaged and sold.

The centrate 714, primarily comprised of nitrates of lithium, sodium and potassium, is discharged into a nitrates holding tank 716. The liquor in the nitrates holding tank 716 can be reused elsewhere in the lithium recovery process 20 or in the first lithium extraction process 10 (FIG. 1). However, some solution will need to be bled from the process to prevent accumulation of contaminants within the process (for example sodium, potassium, rubidium, caesium). The bled solution represents a small by-product nitrates stream.

The by-product nitrates stream is pumped by pump 718 from the nitrates holding tank 716. The by-product nitrates stream can either be discharged to a waste area or can be further treated. The further treatment can comprise recovery of the heavier alkali metal salts (potassium, rubidium and caesium). These alkali metal salts may be evaporated to dryness and converted to prills for marketing. For example, potassium nitrate in particular is valuable as a fertiliser.

EXAMPLES

Non-limiting Examples of the process and system will now be described.

Example 1

In this Example, the production of a solution comprising lithium nitrate, such as may be used as the feed for the process described above, is provided.

It was noted that the solution comprising lithium nitrate was produced in essentially the same manner as the first stages of the process and system as outlined in the applicant's co-pending patent WO2017/106925. However, the process was terminated prior to the lithium nitrate crystallisation stage of WO2017/106925 (i.e. after thermal hydrolysis, pH adjustment and lithium carbonate addition).

Raw PLS Production

FIG. 8 shows the major items of plant and equipment employed to extract the lithium values from calcined (β) spodumene. In the setup of FIG. 8, β spodumene was fed at a rate of one tonne per day (up to 50 kg/hour, dry basis), and the leached solids were separated from a lithium nitrate-rich pregnant leach solution (PLS).

The β spodumene was added to the feed mixer (a conventional concrete mixer fitted with a 304 L stainless steel bowl) at a rate of 50 kg/hour, together with 63 kg by weight of nominally 50% nitric acid, to make 123 kg/hr slurry, 75 l/hr by volume. In practice, batches with the correct proportions of calcined spodumene and nitric acid were made up periodically (e.g. hourly).

Nitric acid was added in substantial stoichiometric excess: to 150%, to maximise leaching of lithium values from the calcined spodumene. Nitric acid concentrations lay within the range 30-50% $HNO_3$ by weight, with the balance water, but concentrations towards the higher end of this range were favoured to minimise downstream evaporation loads. In practice, the strength of the acid used was determined by the rheological properties of the blends of acid and calcined spodumene, taking into consideration the changes the aqueous phase underwent during the leaching reaction:

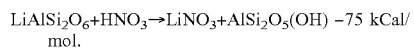
$LiAlSi_2O_6+HNO_3 \rightarrow LiNO_3+AlSi_2O_5(OH)$ −75 kCal/mol.

In practice, this reaction showed that a liquid (nitric acid) was readily able to be converted into a solid (lithium nitrate), albeit one highly soluble in hot water. The slurry exiting the digestion reactor (i.e. the three-compartment autoclave, substantially manufactured of titanium) was controlled to have a sufficient liquid phase to ensure it was pumpable, but not so much liquid as to allow the solids and liquids to segregate significantly.

Use of 50% acid was noted to be close to the safe upper concentration limit. The overall reaction was exothermic which, on the basis (Mol weight 63), converted to 135 kCal/kg of total feed slurry. The heat energy released both heated the feed blend from 25° C. to 80° C. net, which consumed ~35 kcal/kg total feed slurry, while the balance (100 kCal) was consumed in boiling off water plus nitric acid vapour; the quantity of the latter boiled off being ~0.2 kg water equivalent, reducing 1 kg of feed (solids plus liquids phase) to 0.8 kg product, of which 0.44 kg was spodumene concentrate and 0.36 kg was a blend of 0.12 kg lithium nitrate, plus 0.8 kg of aluminium nitrate and other soluble nitrates, plus 0.16 kg of nitric acid plus water.

The resultant lithium nitrate slurry had its pressure reduced and was passed for storage into a 100 litre holding tank. From the holding tank, the lithium nitrate slurry was passed to a plate-and-frame filter press. The adopted filtration approach comprised repeated wash and air-drying cycles. At the end of a final drying cycle, the air-flow to the filter press was stopped, and the filter press was opened for filter cake discharge. The resultant low-moisture filter cake (leached spodumene concentrates) was discharged from the filter cloths for disposal. The quantity of wash water employed in the filter press was set by the extent of filter cake washing required, but initial trials were conducted using an equal mass of water as filter cake, namely, 16 litres per cycle or 50 litres per hour, resulting in production of a net 75 litres per hour of raw pregnant leach solution (raw PLS). This raw PLS was passed to a 200 litre holding tank.

The following preliminary equipment sizings and parameters were recorded for the raw PLS production, based on a 50 kg/hour β spodumene (dry basis) pilot-scale plant design capacity:

nitric acid (as 65% $HNO_3$) flow to digestion reactor feed mixing tank: 63 kg per hour.
feed to digestion reactor, total by weight: 113 kg/hr.
digestion reactor feed pump discharge pressure (max. operating): 8 Bar gauge.
digestion reactor feed pump combined feed temperature: near ambient.
volume of feed to digestion reactor, and to dewatering filter: 80 l/hr.
weight of tailings (volume 30 l/hr, 10% moisture): 50 kg/hr.
hot wash water reporting to filtrate: 27 l/hr.
total filtrate (raw PLS, nitric acid plus wash water less cake): 77 kg/hr.
feed mixer, standard concrete mixer, stainless steel bowl: 200 litre bowl capacity.
feed holding tank, with agitator, HDPE or PP, covered: 0.5 m dia.×1.0 m SWD.
digestion reactor (200 litres total volume): 0.35 m dia×2.0 m long, titanium.
filter feed pump 100 l/hr, to 8 Bar operating pressure: peristaltic.
filter feed tank (200 l capacity, polypropylene, agitated, covered): 0.5 m dia.×1.0 m SWD.
plate-and-frame filter press (20 minutes' cycle time): 5 plates each 0.5 m×0.5 m.
Raw PLS (filter press filtrate) holding tank (covered, 200 l capacity): 0.5 m dia.×1.0 m SWD.
instrument air compressor capacity: 100 l/hr @8 Bar, 25° C.

Purified PLS Production

The raw PLS from the 200 litre holding tank was next passed to a number of purification and neutralisation stages to produce a purified PLS. In these stages, reagents were added to promote the precipitation of base metals and to neutralise remaining nitric acid. The solid precipitates were removed by passing the solution and precipitates to a plate-and-frame filtration stage.

The raw PLS from the 200 litre holding tank was pumped as a hot (near-boiling) aqueous solution to an electrically heated single effect 100 litre evaporator formed of heat-resistant glass, which was heated via an electrical heating jacket and which was able to contain a few hours' production of concentrated liquor. In the evaporator, water and nitric acid were boiled off, with the vapour stream being collected for use elsewhere in the process (e.g. to nitric acid production). Evaporation was performed up to 140° C. and for a sufficient time to allow for hydrolysis of aluminium and ferric iron values.

A dense but pumpable slurry was pumped by a positive displacement pump from the evaporator to a 120 litre filter feed tank, where it was maintained at a pressure of 6-8 Bar and temperature of ~180° C. Hot wash water was added to the tank to maintain the nitric acid concentration in the aqueous phase below 5% $HNO_3$. As required, compressed air (at ~1,000 kPa) was added to the tank. The liquor detention time provided in the tank was around 2 hours, sufficient for further aluminium values to be precipitated and for lithium values to be fully leached therefrom.

The resultant liquid phase from the filter feed tank was flowed under pressure to another plate-and-frame filter press which was operated with wash and air-drying cycles similar to the previously described plate-and-frame filter press. The filter cake from the filter press was periodically discharged for disposal. The filtrate stream from the filter press was passed on to a purification stage that comprised a series of three stirred precipitation tanks. These were arranged for sequentially removing residual aluminium, magnesium and calcium impurities from the PLS by adding lithium hydroxide solution (a downstream product).

The filtrate stream was passed to a first 300 litre precipitation tank which was configured for $Al(OH)_3$ precipitation. In this tank, the solution pH was raised to around 2-3 whereby residual aluminium values precipitated as aluminium hydroxide crystals. The resultant supernatant solution was then passed to a second 300 litre precipitation tank was which configured for $Mg(OH)_2$ precipitation. In this tank, the solution pH was raised to around pH 10.5 to precipitate magnesium values as insoluble magnesium hydroxide crystals. Again, the resultant supernatant solution was passed to a third 300 litre precipitation tank where residual calcium was removed by precipitating it as insoluble calcium carbonate ($CaCO_3$—calcite). In addition, a correct quantity of lithium carbonate (i.e. a downstream product) was added.

The resultant liquor from the precipitation tanks was passed to a 300 litre polishing filter feed tank in which the liquor was held, ready for filtering of the solids. From this tank, the liquor along with precipitated solids were pumped by a feed pump to a polishing candle filter to be filtered from the liquor as dewaterable crystalline solids. The solids filtered out by the polishing filter were collected and disposed of. The filtrate from the polishing filter comprised a purified lithium nitrate solution.

The following preliminary equipment sizings and parameters were recorded for the purified PLS production:

feed to evaporator (raw PLS, 77 kg/hr): 13 kg/hr $HNO_3$, 12.5 kg/hr, $LiNO_3$, 6.5 kg/hr other nitrates, 45 kg/hr $H_2O$.
evaporator off-vapours: 17 kg/hr $HNO_3$, 40 kg $H_2O$.
evaporator capacity: 52 l/hr water equivalent.
evaporator duty (energy input/hr): 140 MJ (40 KW).
cooling water (CW) flow to column condenser ($\Delta T=20°$ C.): 2,000 l/hr (0.6 l/sec, requires 25 mm dia. pipe).
crystal slurry from evaporator to filter feed tank: 25 kg/hr (12.5 kg/h $LiNO_3$, 2.5 kg/h $Al(OH)_3$, 5 kg/h $HNO_3$ soln.
positive displacement (P.D.) pump: 20 l/hr max.
dilution water flow to Filter feed tank: 5 kg/hr.
total feed to Filter press: 30 kg/hr.
filter feed tank (0.12 m$^3$, titanium, 10 Bar max): 0.25 m dia.×2.2 m high.
wash water to filter press: 5 kg/hr.
filter cake from filter press: 3 kg/hr.
plate-and-frame filter press (60 minutes' cycle time): 2 plates, each 0.5 m×0.5 m.
filtrate from filter press (combined): 32 kg/hr.
precipitation tanks (3 off, each 0.3 m$^3$ capacity, HDPE/PP: 0.6 m dia×1.6 m SWD.
candle filter, (7 candles each 60 cm×10 cm OD: 0.5 m dia×1.0 m total height.
candle filter feed tank, 304 L ss: 0.6 m dia.×1.2 m SWD.
candle filter feed pump: 40 kg/hr, 10 Bar.
purified PLS: 30 kg/hr (15 kg/hr $LiNO_3$, 1 kg/hr K/$NaNO_3$, 14 kg/hr water.

The resultant PLS was observed to be substantially contaminant free, with minor concentrations of impurity elements. The purified PLS was ready to be passed to the first thermal treatment procedure of the process as herein described.

The concentration of several elements in the purified PLS was analysed using standard techniques. The results of this analysis are presented in Table 1.

Next, a portion of the PLS was boiled down to produce a crude lithium nitrate product. No washing was performed on the crude product. The mass fraction of the same elements in the crude lithium nitrate product were analysed, again using standard techniques. The results of this analysis are also presented in Table 1.

TABLE 1

(Concentrations (mg/L) and mass fractions (%) of the most common elements in the PLS and the crude lithium nitrate respectively; the concentration/fraction of lithium nitrate equivalent is also provided):

|    | PLS (mg/L) | Crude $LiNO_3$ (wt %) |
|----|------------|-----------------------|
| Li | 26949      | 9.96                  |
| Na | 2020       | 0.629                 |
| K  | 292        | 0.100                 |
| Ca | 15         | 0.0474                |
| Fe | 0          | 0.0374                |
| Al | 22         | 0.0173                |
| Be | 10.6       | 0.0104                |
| Zn | 5.42       | 0.00987               |
| Ni | 0.1        | 0.007                 |
| Rb | —          | 0.0066                |
| Cu | 2.86       | 0.0065                |
| Mg | 0.1        | 0.0026                |
| Sr | 1.8        | 0.0016                |
| Cr | 0.1        | 0.0014                |
| Cs | —          | 0.0011                |
| Co | 0.1        | 0.0006                |
| Ba | 0.33       | 0.0004                |

TABLE 1-continued (Concentrations (mg/L) and mass fractions (%) of the most
common elements in the PLS and the crude lithium nitrate
respectively; the concentration/fraction of lithium
nitrate equivalent is also provided):

|       | PLS (mg/L) | Crude LiNO$_3$ (wt %) |
|-------|------------|-----------------------|
| Pb    | 0          | 0.0002                |
| Mn    | 0          | 0.0001                |
| As    | 0          | 0.0001                |
| U     | —          | 0.00005               |
| LiNO$_3$ | 268 (g/L) | 98.93              |

The PLS was noted to have a high concentration of lithium, which comprised >9 wt % (>98 wt % as lithium nitrate) of the crude lithium nitrate. Sodium was the most common contaminant, comprising ~0.6 wt % of the crude lithium nitrate. The next most common contaminant was potassium, which comprised ~0.1 wt % of the crude lithium nitrate. The remaining eighteen elements cumulatively comprised ~0.15 wt % of the crude lithium nitrate.

In terms of affecting purity of a final lithium hydroxide monohydrate and lithium carbonate, sodium and potassium were therefore the main contaminants of note. However, the presence of sodium and potassium in these concentrations within the PLS was also noted to not detrimentally affect the purity of the lithium hydroxide monohydrate product. The ionic radii of sodium and potassium were noted to be substantially larger than for lithium and so they were not easily incorporated into the lithium hydroxide monohydrate crystal structure. Washing the crystallised lithium hydroxide monohydrate also helped to redissolve any sodium and/or potassium salts that may have co-precipitated during crystallisation.

Likewise, the presence of sodium and potassium was observed not to detrimentally affect the purity of the lithium carbonate product. Lithium carbonate was noted to be sparingly soluble. Its solubility is about 1.5 g/100 mL water at 0° C. and decreases to about 0.7 g/100 mL water at 100° C.—i.e. it has a negative-sloping temperature-solubility curve. On the other hand, sodium and potassium carbonates are quite soluble in water. For example, sodium carbonate has a solubility of about 7 g/100 mL water at 0° C. and increases to about 45 g/100 mL water at 100° C. This meant that, due to the low concentrations of sodium and potassium carbonates present, these carbonates stayed in solution, even as lithium carbonate precipitated. The possibility of co-precipitation of sodium and potassium carbonates was further reduced by performing the lithium carbonate precipitation at elevated temperatures. This had the additional benefit of increasing the recovery of lithium carbonate. Sodium and potassium carbonates that did co-precipitate were observed to be washed off the lithium carbonate product during centrifugation.

Thus, battery grade lithium hydroxide and marketable grade lithium carbonate were able to be produced from the purified PLS using the process as herein described. It was further noted that high-purity lithium hydroxide and lithium carbonate were able to be produced from solutions comprising lithium nitrate with similar characteristics as the PLS described above.

Example 2

In this Example, several calculations and design parameters for a pilot plant were produced, wherein lithium products were recovered from a purified solution comprising lithium nitrate using e.g. the process described in Example 1.

A purified solution comprising lithium nitrate was fed to a lithium recovery process (e.g. process 20 in FIGS. 1 & 2) at a rate of 30 kg/hr. The solution comprised 15 kg/hr LiNO$_3$, 1 kg/hr of KNO$_3$ and NaNO$_3$ total, and 14 kg/hr water. The solution comprising lithium nitrate was passed into a purified lithium nitrate holding tank having a capacity of 100 L, with a diameter of 0.6 m and a side water depth (SWD) of 1.2 m.

The solution comprising lithium nitrate was discharged from the holding tank into an electrically heated single-effect evaporator (see e.g. unit 302 in FIGS. 2 & 3). In the evaporator, 8 kg/h of water was evaporated. As a result, a remaining 6 kg/hr water, 15 kg/hr LiNO$_3$ and 1 kg/hr of KNO$_3$ and NaNO$_3$ total was passed from the evaporator to a melting vessel (see e.g. unit 320 in FIGS. 2 & 3). The melting vessel comprised electrical induction heating and was operated up to a temperature of ~400° C. (i.e. above the melting point of lithium nitrate). The melting vessel drove off a majority of remaining water and produced a molten lithium nitrate liquid which collected at the bottom of the vessel. The molten liquid was passed to a decomposition vessel (see e.g. unit 404 in FIGS. 2 & 3).

The decomposition vessel was fully internally lined with periclase and was jacketed so as to indirectly heat the vessel contents by electrical induction to cause the contents to reach temperatures of ~600° C. (the decomposition temperature of lithium nitrate). As the lithium nitrate decomposed, NOx and oxygen gases were produced. The maximum flow of NOx and oxygen from the decomposition vessel was 12 kg/h HNO$_3$ equivalent at approximately 600° C. The NOx and oxygen from the decomposition vessel were combined with water and nitric acid vapours from the lithium extraction process (when employed), resulting in a total flow of gases of approximately 50 kg/hr at 300° C. to a nitric acid production facility. Of this 50 kg/hr of gas flow, 29 kg/hr was HNO$_3$.

As above, both the melting and decomposition vessels were indirectly heated. The latent heat of fusion of anhydrous LiNO$_3$ was noted to be 0.36 KJ/kg. The heat capacity of molten LiNO$_3$ was noted to be 0.93 J/kg/° C. The total energy to melt and heat the 15 kg/hr LiNO$_3$ from 60° C. to 600° C. (i.e. the operating temperature of the decomposition vessel) was 12.9 MJ/h. The heat of decomposition of 15 kg/hr LiNO$_3$ was 47 MJ/hr. Therefore, the total energy required to heat, melt and decompose the LiNO$_3$ was 60 MJ/hr.

In a variation, the melting and decomposition vessels were heated with gas. Where the vessels were electrically heated, approximately 20 kW of power was required. Where the vessels were gas heated, approximately 100 MJ/hr of gas was required.

Simultaneous to its decomposition function, the decomposition vessel was able to function as a froth flotation cell operating at high temperatures. Because the lithium oxide crystals that formed during decomposition of lithium nitrate were less dense than the remaining lithium nitrate, the lithium oxide crystals tended to move upwards (i.e. to 'float') through to the top of the decomposition vessel. In this regard, the NOx and oxygen gases produced during decomposition formed bubbles in the vessel, with the bubbles moving upwards to the top of the vessel, entraining and thereby separating the less dense lithium oxide crystals.

A resultant froth of lithium oxide crystals in lithium nitrate-rich bubbles formed on top of the remaining lithium nitrate slurry and overflowed into a peripheral collection launder, whereas the remaining lithium nitrate slurry formed an underflow of the decomposition vessel. The collection launder directed the overflow of lithium oxide crystals in lithium nitrate-rich bubbles, via an exit port and pipe, into a screw press conveyor (i.e. one or more screw press conveyors operating in parallel). The screw press conveyor comprised a rotor of high-chromium steel covered with periclase (applied using plasma techniques) and a stator made of porous, sintered periclase. Other surfaces were lined internally with periclase tiles as required.

In the screw press conveyor, the molten lithium nitrate was squeezed out of the lithium oxide crystals and was collected at a bottom outlet thereof. A combined lithium nitrate stream from the screw press conveyor was combined with the lithium nitrate underflow from the decomposition vessel and was pumped to a lithium carbonate precipitation stage (see e.g. stage 60 in FIGS. 1, 2 & 6).

By squeezing out the molten lithium nitrate, the screw press also produced a compacted mass of lithium oxide crystals essentially devoid of liquid, with the crystals exiting an upper end of the screw press conveyor at a rate of ~3 kg/hr of lithium oxide. The lithium oxide was collected and discharged into a lithium oxide slaking tank (see e.g. tank 602 in FIGS. 2 & 6). The lithium oxide slaking tank had a capacity of 100 L. When dry lithium hydroxide was the final product, 1.8 kg/hr of process water was added to the slaking tank to convert the lithium oxide to dry lithium hydroxide. However, typically lithium hydroxide monohydrate was the final product, in which case 3 kg/h of process water was added to the slaking tank to convert the lithium oxide to lithium hydroxide monohydrate. A further 25 kg/h of hot process water was added to the slaking tank to dissolve the lithium hydroxide monohydrate, thereby forming a pumpable solution.

This solution of lithium hydroxide monohydrate was pumped to a lithium hydroxide crystalliser (see e.g. unit 612 in FIGS. 2 & 6) where solution water was evaporated. The crystalliser was an electrically heated single-effect unit and required 20 kW of electricity to evaporate the water.

The crystallised lithium hydroxide slurry was then passed from the crystalliser to a dewatering centrifuge (see e.g. centrifuge 626 in FIGS. 2 & 6) at a rate of 5 kg/hr. The centrifuge produced a lithium hydroxide monohydrate crystal product, with the separated liquid being collected to form part of a recovered liquor stream. In the dewatering centrifuge, interstitial liquor contained within the lithium hydroxide monohydrate crystal product was washed with and substantially replaced by wash water, with this interstitial liquor also being collected and recovered to form another part of a combined recovered liquor stream. The combined recovered liquor stream was reused in other areas of the process. A first portion was sent back to a purification stage of the initial lithium nitrate solution obtained from leaching β spodumene with nitric acid. A second portion was recycled back into the lithium oxide slaking tank. A third portion was sent to lithium carbonate production (see e.g. area 70 in FIGS. 1, 2 & 7).

The combined lithium nitrate stream from the decomposition vessel was collected and passed to a lithium carbonate production stage (see e.g. area 70 in FIGS. 1, 2 & 7). Approximately 1 kg/hr of marketable grade lithium carbonate was able to be produced.

The lithium nitrate stream, including centrate and washate from the lithium hydroxide dewatering centrifuge, was first pumped to a lithium carbonate precipitation tank (see e.g. tank 702 in FIGS. 2 & 7). The lithium nitrate was present in the tank along with small quantities of sodium and potassium nitrates. Nitrates of rubidium and caesium were sometimes also present in small quantities.

A combination of soda ash ($Na_2CO_3$) and/or potash ($K_2CO_3$) was added to the lithium carbonate precipitation tank to precipitate the lithium as sparingly soluble lithium carbonate, thereby forming lithium carbonate ($Li_2CO_3$), sodium nitrate ($NaNO_3$) and potassium nitrate ($KNO_3$). The tank conditions were optimised towards the precipitation of lithium carbonate (i.e. the solubility of lithium carbonate was noted to decrease with increasing temperature). The lithium carbonate precipitation tank was therefore heated to increase the temperature of the contents, increasing the mass of lithium carbonate precipitate formed.

A portion of the lithium carbonate was able to be recycled back to the lithium extraction process, e.g. used to adjust the pH of the raw lithium nitrate solution to cause contaminants (e.g. calcium) in solution to precipitate. However, most of the lithium carbonate slurry was pumped to a dewatering centrifuge via a slurry pump. The dewatering centrifuge (see e.g. centrifuge 708 in FIGS. 2 & 7) which was operated intermittently to remove liquor from the contents of the slurry, thereby producing a lithium carbonate product substantially free of liquor. The centrate from the centrifuge, primarily comprised nitrates of lithium, sodium and potassium, was discharged into a nitrates holding tank (see e.g. tank 716 in FIGS. 2 & 7). This by-product nitrates stream was either discharged to waste or was further treated to recover heavier alkali metal salts (e.g. potassium, rubidium and caesium).

It was noted that a pilot plant constructed according to the above principles could operate as a fully continuous process, adopting modern process control, automation and monitoring techniques. The pilot plant could be constructed in stages, allowing upstream processes to be optimised as downstream equipment was installed.

For example, a pilot plant could be constructed to produce a lithium oxide product alone (i.e. having the highest content of elemental lithium of 46.5% by weight, such that the costs associated with transporting lithium oxide to a customer would be relatively low). Next, depending on market conditions, anhydrous lithium hydroxide could be produced (anhydrous lithium hydroxide contains just over 29% elemental lithium by weight). Finally, a crystallised lithium hydroxide monohydrate could be produced by the addition of a single-effect electrically heated crystalliser.

An advantage of the process and system as disclosed herein is that, depending on the market and the preference of the customer, the process may be terminated at any stage. For example, battery producers may prefer receiving lithium as the oxide as it gives them greater control over the purity of the lithium hydroxide produced, in which case the remaining areas of the plant need not be constructed. As another example, an operator of a mine/concentrator may decide to install the present process and system near its facility. They may prefer the simplicity of a process which ends with a lithium oxide product—as they can avoid the cost/complexity of the lithium hydroxide crystalliser. In this way, the present process and system can provide a great level of flexibility, depending on the needs of both the lithium customer and the plant operator.

Further Variations

It is to be understood that the characteristics of the solution comprising lithium nitrate, whether produced by reacting spodumene with nitric acid or from another source, may differ to the extent that variations to the above method and system may be appropriate.

Other unit operations can be included in the overall process in line with good engineering practices, in particular, for the provision of services and utilities, the efficient utilisation of waste heat, the conservation of water, and the minimisation of all waste streams.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features.

The invention claimed is:

1. A process for extracting lithium and aluminium from a lithium-containing aluminosilicate mineral, the process comprising the sequential steps of:
    mixing the lithium-containing aluminosilicate mineral with nitric acid, thereby forming a mixture;
    subjecting the mixture to a leaching process such that the lithium and the aluminium are leached into an aqueous phase, thereby forming a leach slurry comprising a leach liquor and a leached mineral, wherein the leach liquor comprises the lithium and the aluminium;
    passing the leach slurry through a solid-liquid separation stage in which the leach liquor is separated from the leached mineral; and
    subjecting the leach liquor to an aluminium precipitation stage in which the aluminium therein is precipitated, said aluminium precipitation stage comprises a thermal treatment comprising heating the leach liquor to cause aluminium to auto-precipitate therefrom.

2. The process according to claim 1, wherein the leaching process comprises heating the mixture and wherein the process further comprises allowing the leach slurry to cool, thereby forming a cooled leach slurry, and passing the cooled leach slurry through the solid-liquid separation stage.

3. The process according to claim 2, the process further comprising reducing a pressure of the cooled leach slurry, prior to passing the cooled leach slurry through the solid-liquid separation stage.

4. The process according to claim 1, wherein the lithium-containing aluminosilicate mineral comprises one or more of: spodumene, petalite, eucryptite, lepidolite, zinnwaldite.

5. The process according to claim 4, wherein the lithium-containing aluminosilicate mineral comprises β spodumene.

6. The process according to claim 5, wherein the process further comprises calcining α spodumene to convert the α spodumene to the β spodumene.

7. The process according to claim 1, wherein the solid-liquid separation stage further comprises washing the leached mineral with water, wherein said washing produces wash water, and wherein the process further comprises adding the wash water to the leach liquor such that the leach liquor that is subjected to the aluminium precipitation stage comprises the wash water.

8. The process according to claim 1, the process further comprising separating the aluminium precipitate from the solution comprising the lithium.

9. The process according to claim 8, the process further comprising precipitating contaminants in the solution comprising the lithium, thereby producing contaminant precipitates in the solution, and separating the contaminant precipitates from the solution.

10. The process according to claim 1, wherein the process further produces a gas comprising nitric acid vapour, and the process further comprises passing said gas to a nitric acid production process.

11. The process according to claim 1, wherein the process further produces a gas comprising nitric acid vapour, and wherein the process further comprises: (i) condensing said gas, thereby producing condensed nitric acid, and (ii) using said condensed nitric acid in the mixing with the lithium-containing aluminosilicate mineral, such that said condensed nitric acid forms at least a portion of the nitric acid mixed with the lithium-containing aluminosilicate mineral.

12. The process according to claim 1, wherein the lithium-containing aluminosilicate mineral is mixed with a stoichiometric excess of the nitric acid.

13. The process according to claim 1, wherein the nitric acid is in a solution having a nitric acid concentration in the range of between 28% to 68% by weight.

14. The process according to claim 1, wherein the aluminium precipitation stage further comprises one or more pH adjustment stages, wherein in each of said one or more pH adjustment stages, a pH of the leach liquor is raised by adding an alkali to the leach liquor; and wherein the aluminium precipitation stage further comprises precipitating aluminium from the leach liquor as aluminium hydroxide.

15. The process according to claim 1, wherein the thermal treatment further produces a gas comprising nitric acid vapour, and wherein the process further comprises passing said gas to a nitric acid production process.

16. The process according to claim 1, wherein the thermal treatment further produces a gas comprising nitric acid vapour, and wherein the process further comprises: (i) condensing said gas, thereby producing condensed nitric acid, and (ii) using said condensed nitric acid in the mixing with the lithium-containing aluminosilicate mineral, such that said condensed nitric acid forms at least a portion of the nitric acid mixed with the lithium-containing aluminosilicate mineral.

17. A process for extracting lithium and aluminium from a lithium-containing aluminosilicate mineral, the process comprising the sequential steps of:
    mixing the lithium-containing aluminosilicate mineral with nitric acid, thereby forming a mixture;
    subjecting the mixture to a leaching process whereby the lithium and the aluminium are leached into an aqueous phase, thereby forming a leach slurry comprising a leach liquor and a leached mineral, wherein the leach liquor comprises the lithium and the aluminium;
    passing the leach slurry through a solid-liquid separation stage in which the leach liquor is separated from the leached mineral; and
    subjecting the leach liquor to an aluminium precipitation stage in which aluminium therein is precipitated, said aluminium precipitation stage comprising:
        a thermal treatment, said thermal treatment comprising heating the leach liquor to cause aluminium to auto-precipitate therefrom; and
        one or more pH adjustment stages, wherein in each of said one or more pH adjustment stages, a pH of the leach liquor is raised by adding an alkali to the leach liquor.

18. The process according to claim 17, the process further comprising: passing a gas comprising one or more of oxygen, oxides of nitrogen, nitric acid vapour, and water vapour, to a nitric acid production process; and producing nitric acid in said nitric acid production process; wherein the nitric acid produced in the nitric acid production process forms at least a portion of the nitric acid mixed with the lithium-containing aluminosilicate mineral.

19. The process according to claim 17, wherein the lithium-containing aluminosilicate mineral comprises β spodumene.

20. The process according to claim 17, wherein the lithium-containing aluminosilicate mineral comprises one or more of: spodumene, petalite, eucryptite, lepidolite, zinnwaldite.

21. The process according to claim 17, wherein the alkali comprises lithium hydroxide.

22. The process according to claim 17, wherein said heating of the leach liquor during the thermal treatment produces a gas comprising nitric acid vapour, and wherein the process further comprises: (i) condensing said gas, thereby producing condensed nitric acid, and (ii) using said condensed nitric acid in the mixing with the lithium-containing aluminosilicate mineral, such that said condensed nitric acid forms at least a portion of the nitric acid mixed with the lithium-containing aluminosilicate mineral.

23. The process according to claim 17, wherein the lithium-containing aluminosilicate mineral is mixed with a stoichiometric excess of the nitric acid.

24. The process according to claim 17, wherein the solid-liquid separation stage further comprises washing the leached mineral with water, wherein said washing produces wash water, and wherein the process further comprises adding the wash water to the leach liquor such that the leach liquor that is subjected to the aluminium precipitation stage comprises the wash water.

* * * * *